United States Patent [19]

Fujioka

[11] Patent Number: 5,604,342
[45] Date of Patent: Feb. 18, 1997

[54] NONCONTACT CARD AND CARD SYSTEM

[75] Inventor: Shuzo Fujioka, Itami, Japan

[73] Assignees: Mitsubishi Denki Kabushiki Kaisha, Tokyo; Mitsubishi Semiconductor Software Co. Ltd., Hyogo, both of Japan

[21] Appl. No.: 375,981

[22] Filed: Jan. 20, 1995

[30] Foreign Application Priority Data

Mar. 30, 1994 [JP] Japan .................................. 6-060821

[51] Int. Cl.$^6$ ..................................................... G06K 5/00
[52] U.S. Cl. ........................................... 235/435; 235/449
[58] Field of Search .................................. 235/435, 375, 235/380, 449

[56] References Cited

U.S. PATENT DOCUMENTS 5,030,807  7/1991  Landt et al. ............................ 235/375
5,418,353  5/1995  Katayama et al. ..................... 235/375

FOREIGN PATENT DOCUMENTS 377257    7/1990  European Pat. Off. ............... 235/435
2-226392  9/1990  Japan .................................... 235/449
4-190479  7/1992  Japan .................................... 235/380

Primary Examiner—John Shepperd
Attorney, Agent, or Firm—Leydig, Voit & Mayer

[57] ABSTRACT

An IC card reader/writer includes a control unit incorporating a central processing unit, read only memory, and random access memory. In addition, the reader/writer includes a UART, a sending circuit for modulating a digital signal received from the UART, transmitting and receiving antennas, and a receiving circuit for demodulating received signals. The control unit controls the IC card reader/writer by setting an interval between a trigger signal and a start flag at the time of data transmission equal in duration to at least one frame of data, for example, eight bits of data. In a specific embodiment, the trigger signal may be followed by eight bits of $00_H$, followed by a start flag and eight bits of data $5A_H$, followed by a data stream including desired information.

5 Claims, 26 Drawing Sheets

NONCONTACT CARD AND CARD SYSTEM

BACKGROUND OF THE INVENTION

1. Field of the Invention

The present invention relates to a noncontact IC card, a card reader/writer, and a card system, which employ radio waves as communication media thereof.

2. Description of the Related Art

FIG. 24 shows a card apparatus (card system), which is disclosed in AIM JAPAN [Data carrier Technic and Application] 1990 Nikkan Kogyo Shinbun. This card system includes a conventional card reader/writer 1 and a noncontact IC card 2. FIG. 25 shows a receive circuit 17 of the conventional card reader/writer 1.

In FIG. 24, the card reader/writer 1 includes an input/output circuit 11, which is connected to a host computer (HOST) to communicate with the host computer, a control unit 12, which controls the whole system and processes data, a UART (universal asynchronous receiver transmitter) 13, which converts serial data to parallel data and vice versa, a send circuit 14, which modulates the digital signals of serial data received from the UART 13 and converts them to electrical signals, a transmitting antenna 15, which includes a parallel resonance circuit and transmits the electrical signals as radio waves, a receiving antenna 16, which includes a parallel resonance circuit and converts received radio waves into electrical signals, a receive circuit 17, which demodulates the electrical signals and converts them into digital signals, and a power circuit 18, which supplies a power source of, for example, 5 VDC, to the foregoing constituents and a power source of, for example, 24 VDC, to the transmitting antenna 15 and the receiving antenna 16. The control unit 12 includes a CPU, ROM, RAM, etc.

Further in FIG. 24, the noncontact IC card 2 is equipped with a transmit-receive antenna 21, which converts received radio waves into electrical signals and vice versa, a receive circuit 22, which demodulates the electrical signals and converts them into digital signals, a UART (universal asynchronous receiver transmitter) 23, which converts serial data to parallel data and vice versa, a control unit 24, which controls the whole system and processes data, a send circuit 25, which modulates the digital signals of the serial data received from the UART 23 and converts them into electrical signals, and a power circuit 26, which includes a battery. The control unit 24 is equipped with a CPU, ROM, RAM, etc.

In FIG. 25, the receive circuit 17 is provided with a voltage controlled receiving buffer amplifier 171 connected to the receiving antenna 16, an AGC (automatic gain control) 172, which automatically controls the gain of the voltage controlled receiving buffer amplifier 171, and a demodulator 173 connected between the receiving buffer 171 and the UART 13.

The operation of the conventional card reader/writer 1 and the noncontact IC card 2 will now be described with reference to FIGS. 26, 27, 28, and 29. FIGS. 26 and 27 show the forms of the signals sent from the card reader/writer 1 to the noncontact IC card 2. FIG. 28 shows a flowchart which gives a brief overview of the operation of the noncontact IC card 2. FIG. 29 shows a flowchart which gives the details of the operation corresponding to steps 33 and 34 in FIG. 28.

As a basic operation, the card reader/writer 1 sends a command to the noncontact IC card 2 and the noncontact IC card 2 executes the command and sends the result back to the card reader/writer 1. For instance, when the system is applied to a security system, the card reader/writer 1 is installed on a door of a room, while the noncontact IC card 2 is carried by an inhabitant of the room. The card reader/writer 1 continually sends a command, requesting an ID to be returned, and when the noncontact IC card 2 receives the command, it returns the ID. The card reader/writer 1 checks the ID and unlocks the door if it accepts the ID. There are some cases where the host computer connected to the card reader/writer 1 checks the ID.

As shown in (a) of FIG. 26, the signal sent from the card reader/writer 1 to the noncontact IC card 2 is configured so that a trigger signal is sent out first, then a start flag is sent out following a 2-bit interval, and the data shown in FIG. 27 follow.

A frame, which is a unit of data, includes a 1-bit start bit, 8-bit data, a 1-bit parity bit, and a 2-bit stop bit as shown in FIG. 27. The start flag of FIG. 26 indicates the data which have the same configuration as that of the single frame of FIG. 27, the 8-bit data in the single frame having a predetermined bit pattern.

First, upon receipt of the trigger signal shown in (a) of FIG. 26, the noncontact IC card 2 is switched from a sleep state to an active state and enables the UART 23 to receive signals (refer to steps 30 through 32 of FIG. 28). Then, when the noncontact IC card receives the start flag shown in (a) of FIG. 26, it begins receiving a data block shown in FIG. 27 (refer steps 33 and 34), implements the processing in response to the command, sends the result back to the card reader/writer 1 or carries out other appropriate processing, then moves back into the sleep state (refer to a step 35).

The UART 23 of the noncontact IC card 2 starts receiving the data when it detects the 1-bit start bit and receives the following 8 bits as data (refer to a step 40 of FIG. 29). The 2-bit stop bit indicates the break between frames; if this break cannot be detected, it is determined as a framing error and the data received this time is not taken in, and the system waits until it detects the next start bit (1 bit indicating the change from the high level to the low level as shown in FIG. 27), i.e., until synchronization is achieved before it goes back to the step 40 (refer to steps 41 and 42). If no framing error occurs, then the system accepts the next data (refer to a step 43).

In other words, if the start bit is not properly detected, it is very likely that the next start bit cannot be properly detected until the framing error takes place.

As shown in (a) of FIG. 26, after the trigger signal is received, the start flag, which is the data block having a particular bit pattern, is received. The noncontact IC card 2 enables the UART 23 to receive signals only after the end of the trigger signal; therefore, the start flag can be surely received if the trigger signal is properly received.

If, however, the trigger signal is left out as indicated by the dotted line shown in (b) of FIG. 26, resulting in a failure to properly receive the trigger signal (e.g., if the distance between the card reader/writer 1 and the noncontact IC card 2 is just barely within the communication range), then the noncontact IC card 2 is actuated to make the UART 23 ready for receiving, causing a portion of A to be erroneously received as the start bit in the start flag. The UART 23 processes data on an 8-bit basis; therefore, the following start flag cannot be properly received, skipping the whole data block.

The operation of the receive circuit 17 of the card reader/writer 1 will now be described.

The intensity of a radio wave greatly varies depending on the distance between the card reader/writer 1 and the noncontact IC card 2. For this reason, the gain of the receive circuit 17 needs to be adjusted. This is why the receive circuit incorporates an AGC 172. The AGC 172, however, requires some time to restore its original gain once the gain decreases. The card reader/writer 1 has the transmitting antenna 15 and the receiving antenna 16 which share the same frequency; therefore, it receives the radio waves (extremely intense), which the card reader/writer itself sends out through its own receiving antenna 16. This causes the gain of the AGC 172 to decrease for a while after transmission. As a result, the communication distance between the card reader/writer 1 and the noncontact IC card 2 is shortened.

This means that there was a problem with the conventional noncontact IC card 2 in that, if it fails to properly receive the trigger signal from the card reader/writer 1, then it cannot securely receive the start flag and skips the whole data block, resulting in an increased communication error rate with consequent damaged communication reliability.

There was also a problem with the conventional card reader/writer 1 in that, since it uses the same frequency for transmitting and receiving, it receives its own transmitted radio waves through the receiving antenna 16. These intense radio waves decrease the gain of the AGC 172 of the receive circuit 17, which in turn deteriorates the receiving sensitivity and shortens the communication distance. This led to a higher communication error rate with consequent deteriorated communication reliability.

There was still another problem with the conventional card reader/writer 1 in that, since it uses the same frequency for transmitting and receiving, the transmitting antenna 15 and the receiving antenna 16 thereof interfere with each other. This destroys the waveforms of transmitted and received signals, leading to a higher communication error rate and poor communication reliability.

SUMMARY OF THE INVENTION

Accordingly, it is an object of the present invention to provide a noncontact IC card, which is capable of surely receiving a start flag even if it fails to successfully receive a trigger signal.

It is another object of the present invention to provide a card reader/writer which is capable of extending a communication distance by waiting until the receiving sensitivity of the receive circuit is restored or by preventing the receiving sensitivity from being deteriorated.

It is still another object of the present invention to provide a card reader/writer which is capable of preventing interference between the transmitting antenna and the receiving antenna, thus decreasing the communication error rate and improving the communication reliability.

It is further another object of the present invention to provide a card system which is capable of securely receiving the start flag even if it fails to successfully receive the trigger signal, extending the communication distance by waiting for the receiving sensitivity of the receive circuit to recover or by preventing the receiving sensitivity from decreasing, and preventing interference between the transmitting antenna and the receiving antenna, thereby decreasing the communication error rate and achieving higher communication reliability.

A noncontact IC card according to the present invention has a transmit-receive antenna, which converts received radio waves into electrical signals and vice versa, a receive circuit, which demodulates received electrical signals and converts them into digital signals, a UART, which converts the serial data of the digital signals into parallel data and vice versa, a send circuit, which modulates the digital signals of the serial data from the UART and converts them to send electrical signals, and a control unit, which controls the noncontact IC card system, monitors data received from the receive circuit for each bit, and sets the UART ready for receiving when the start flag is detected.

The card reader/writer according to the present invention has a UART, which converts serial data into parallel data and vice versa, a send circuit, which modulates the digital signals of the serial data from the UART and converts them into send electrical signals, a transmitting antenna, which transmits the send electrical signals as radio waves, a receiving antenna, which converts received radio waves into receive electrical signals, a receive circuit, which demodulates the receive electrical signals and converts them into digital signals, and a control unit, which controls the card reader/writer and sets the interval between the trigger signal and the start flag to one frame or more.

The card system according to the present invention includes a card reader/writer having a first UART, which converts serial data to parallel data and vice versa, a first send circuit, which modulates the digital signals of the serial data from the first UART and converts them into first send electrical signals, a transmitting antenna, which includes a series resonance circuit and which transmits the first send electrical signals as radio waves, a receiving antenna, which converts received radio waves into first received electrical signals, a first receive circuit, which demodulates the first received electrical signals and converts them into digital signals, a first control unit, which controls the card reader/writer, and a switching circuit, which is connected between the receiving antenna and the first receive circuit and which disconnects the two during transmission; and a noncontact IC card having a transmit-receive antenna, which converts received radio waves into electrical signals and vice versa, a second receive circuit, which demodulates second receive electrical signals and converts them into digital signals, a second UART, which converts the serial data of the digital signals into parallel data and vice versa, a second send circuit, which modulates the digital signals of the serial data from the second UART and converts them into second send electrical signals, and a second control unit, which controls the noncontact IC card, monitors the data received from the second receive circuit for each bit, and enables the second UART to receive signals when the start flag is detected.

DESCRIPTION OF THE PREFERRED EMBODIMENTS

Embodiment 1

Figure 1:
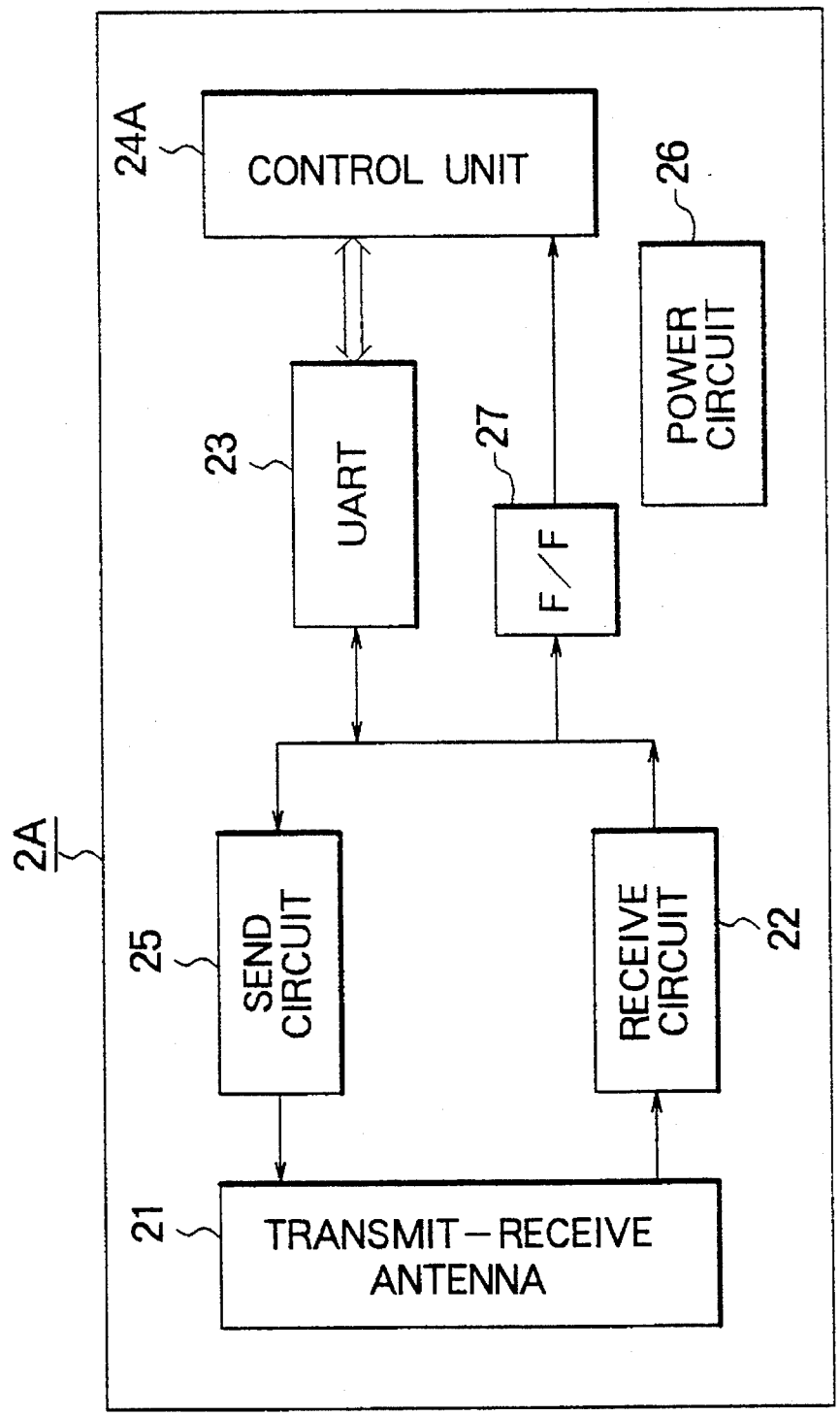
FIG. 1 is a block diagram showing the configuration of the noncontact IC card according to an embodiment of the present invention.

The following describes an embodiment of the present invention with reference to the attached drawings. FIG. 1 shows the configuration of a noncontact IC card 2A according to an embodiment of the present invention, a transmit-receive antenna 21 through a UART 23, a send circuit 25, and a power circuit 26 being the same as those for the conventional noncontact IC card 2.

In FIG. 1, the noncontact IC card 2A includes a control unit 24A, which differs from the conventional control unit 24 in function. The control unit 24A has a CPU, ROM, RAM, etc. It is further equipped with a 1-bit flip-flop (F/F) 27 connected between the receive circuit 22 and the control unit 24A.

Figure 2:
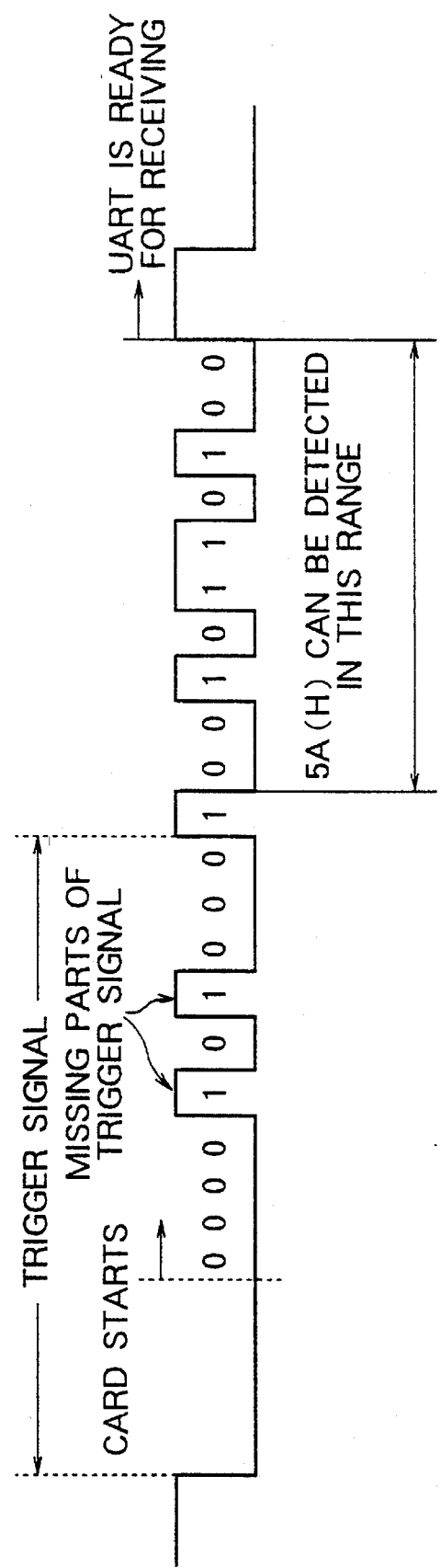
FIG. 2 shows a form of the signal received by the noncontact IC card of FIG. 1.
Figure 3:
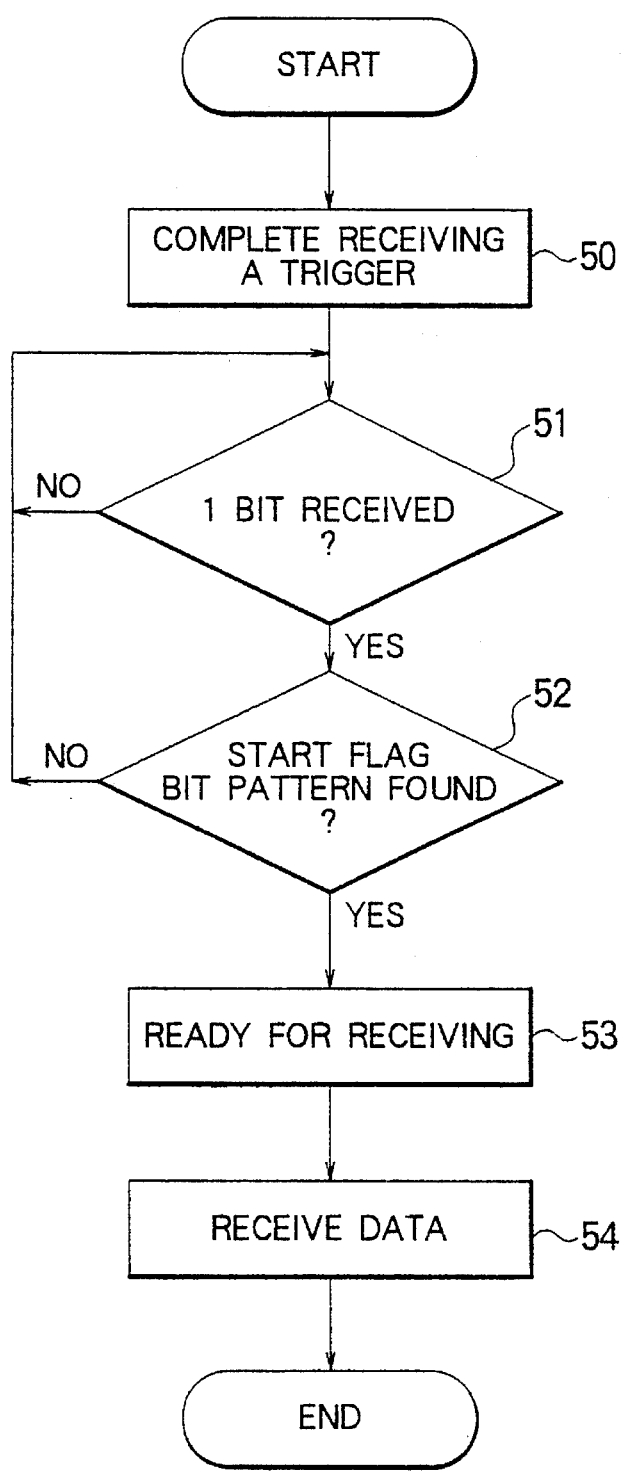
FIG. 3 is a flowchart showing the operation of the noncontact IC card of FIG. 1.

The operation of the noncontact IC card 2A will now be described in connection with FIG. 2 and FIG. 3. FIG. 2 shows the signal received by the noncontact IC card 2A. FIG. 3 shows the flowchart of the operation of the control unit 24A of the noncontact IC card 2A.

As shown in FIG. 1, the noncontact IC card 2A has the F/F 27 so that it can monitor the data received from the receive circuit 22 through the control unit 24A before the data is sent to the UART 23. According to a program of the control unit 24A, the data are received one bit at a time, and when a bit pattern of a start flag is detected, the UART 23 is enabled to receive the data. This allows the start flag to be detected even if the trigger signal is missing.

The control unit 24A receives the data from the F/F 27 one bit at a time and compares a received bit string with the bit pattern of the start flag for each bit (refer to steps 50 through 52 of FIG. 3). For instance, as shown in FIG. 2, if the start flag is a hexadecimal "5A" (hereinafter referred to as "$5A_H$"), then the control unit 24A looks for a pattern of "0010110100" including the preceding and following start bits and parity bits. When the control unit detects the start flag, it enables the UART 23 to be ready for receiving, thereby to begin receiving data (refer to steps 53 and 54).

In other words, since the UART 23 receives 8 bits at a time, the noncontact IC card 2A is provided with the F/F 27, which is capable of monitoring the state of receive data for each bit according to the program of the control unit 24A. The trigger signal is received through the same line as that for receive data; therefore, the UART 23 cannot distinguish data from the trigger. The control unit 24A can, however, eventually distinguish them since the control unit 24A monitors each bit by means of the F/F 27. If the bit pattern of the start flag is "$5A_H$" for example, then the control unit 24A starts receiving one bit at one time after it is actuated by the trigger signal, and it sets the UART 23 ready for receiving when it detects the pattern of "$5A_H$". Hence, the start flag can be surely detected, which reduces the communication error rate, leading to higher communication reliability.

Embodiment 2

Figure 4:
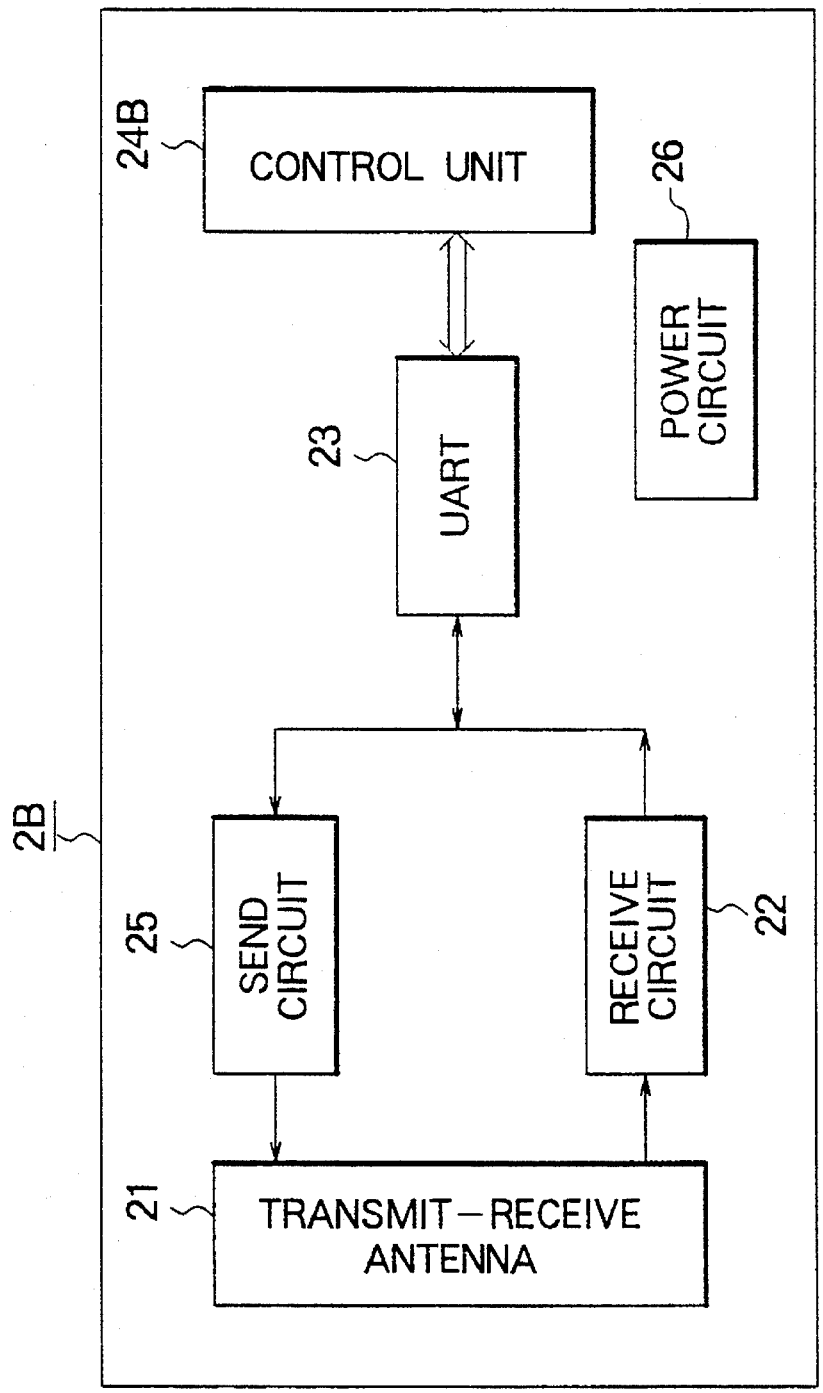
FIG. 4 is a block diagram showing the configuration of the noncontact IC card according to another embodiment of the present invention.

Another embodiment of the present invention will be described with reference to the attached drawings. FIG. 4 shows the configuration of the noncontact IC card 2B according to another embodiment of the present invention, the transmit-receive antenna 21 through the UART 23, the send circuit 25, and the power circuit 26 being the same as those for the conventional noncontact IC card 2.

Figure 5:
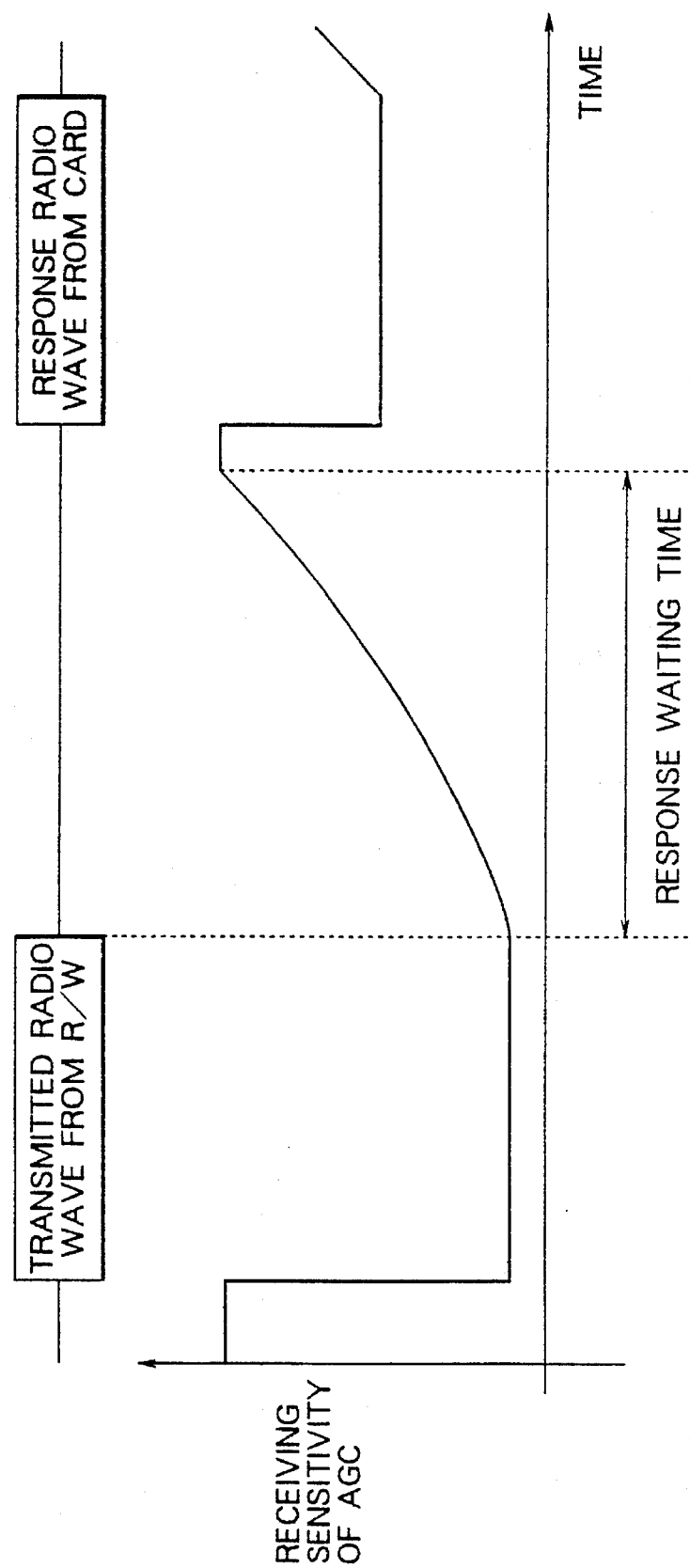
FIG. 5 shows the operation of a card reader/writer for illustrating the operation of the noncontact IC card of FIG. 4.

FIG. 5 shows the sensitivity characteristics of the AGC 172 of the receive circuit 17 of the card reader/writer 1.

Figure 6:
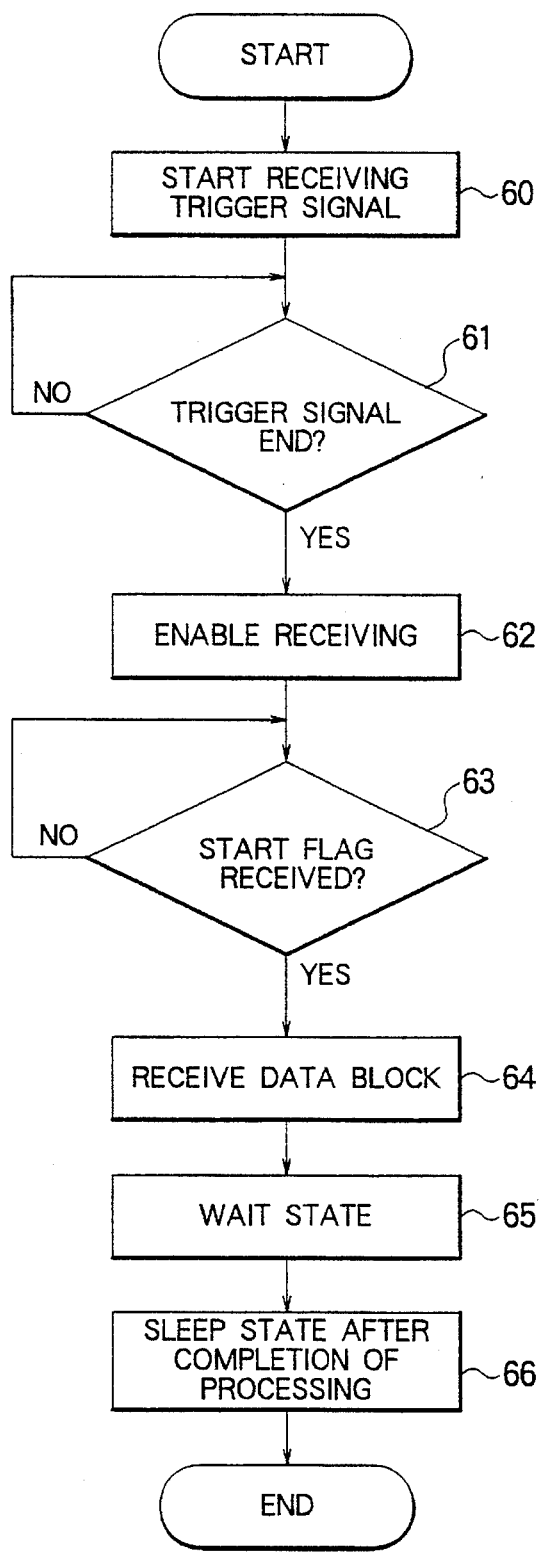
FIG. 6 is a flowchart showing the operation of the noncontact IC card of FIG. 4.

Further, FIG. 6 shows the flowchart of the operation of a control unit 24B of the noncontact IC card 2B.

In FIG. 4, the noncontact IC card 2B includes a control unit 24B, which is different from the conventional control unit 24 in function. The control unit 24B is provided with a CPU, ROM, RAM, etc.

The card reader/writer 1 has a transmitting antenna 15 and a receiving antenna 16, which share the same frequency; therefore it receives radio waves, which it sends out through its own transmitting antenna 15 through its own receiving antenna 16. In the card reader/writer the receive circuit 17 is provided with the AGC 172 which adjusts the receiving sensitivity, thereby extending the receiving distance. The AGC 172, however, takes time to recover its original sensitivity once the sensitivity decreases; therefore, if the card reader/writer 1 receives intense radio waves, which the card reader/writer 1 itself transmits, then the sensitivity cannot be recovered before the noncontact IC card responds.

Accordingly, as shown in FIG. 5, the noncontact IC card 2B is provided with a waiting time so that the noncontact IC card 2B responds after the receiving sensitivity of the AGC 172 of the card reader/writer (R/W) 1 has been recovered. This prevents the communication distance between the card reader/writer 1 and the noncontact IC card 2B from decreasing, thus achieving a lower communication error rate with resultant higher communication reliability.

Figure 28:
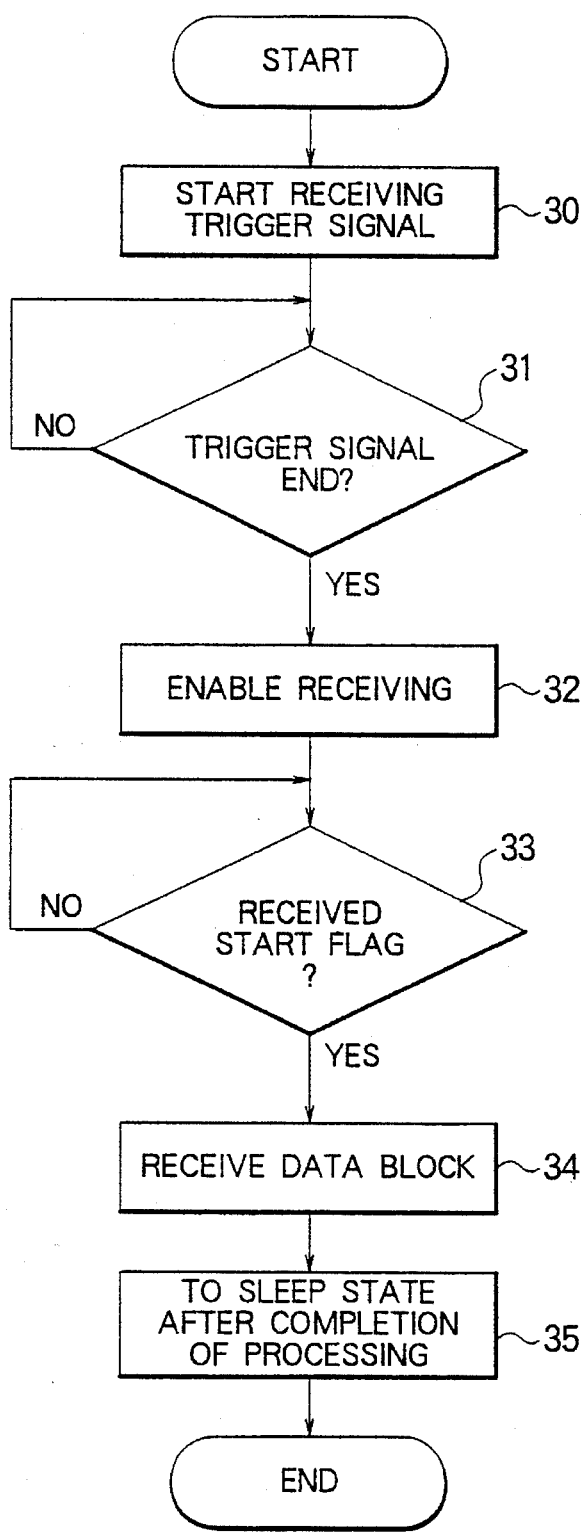
FIG. 28 is a flowchart showing the operation of the noncontact IC card of FIG. 24.
Figure 29:
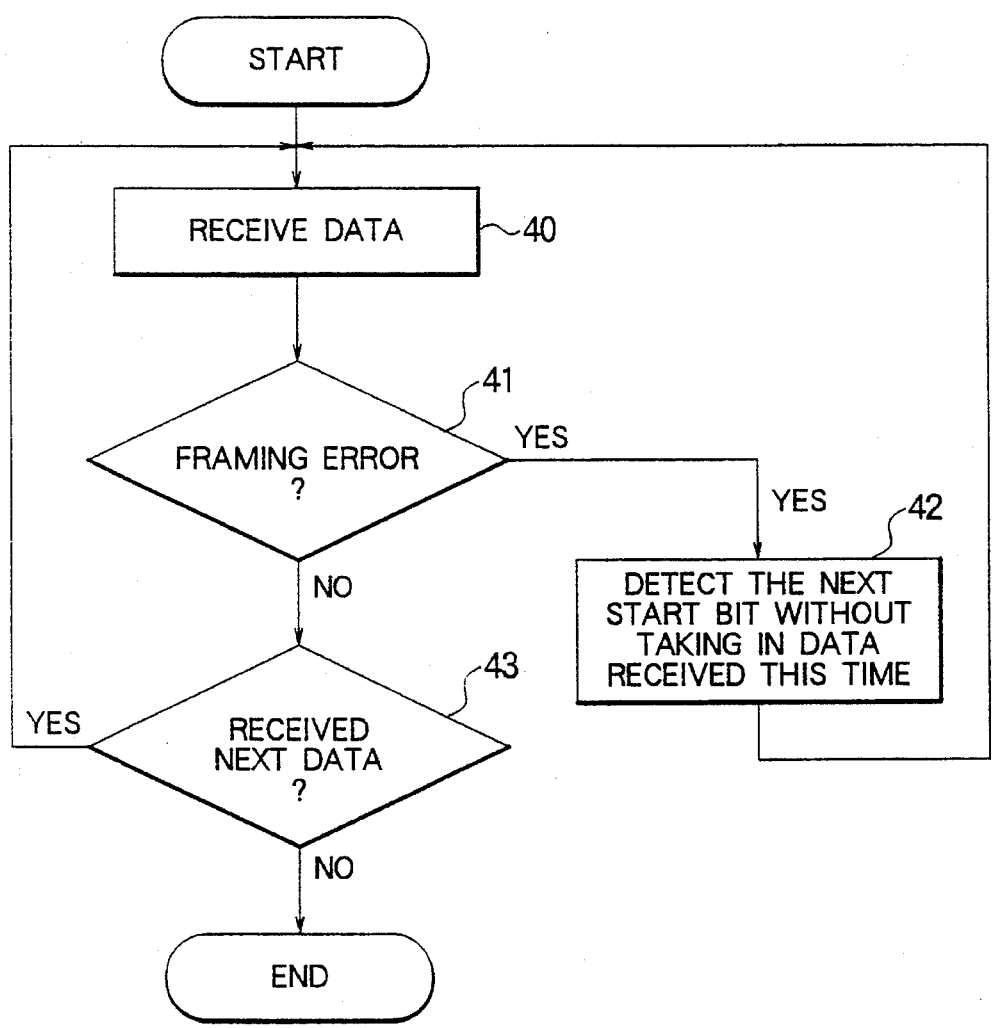
FIG. 29 is a flowchart showing the operation of the noncontact IC card of FIG. 24.

More specifically, as shown in FIG. 6, in a step 65, the control unit 24B of the noncontact IC card 2B provides a response waiting time, e.g., a few milliseconds, after receiving a data block from the card reader/writer 1, then it returns a response to the card reader/writer 1. Other processing (steps 60 through 64, and 66) is the same as that shown in FIG. 28.

Embodiment 3

Figure 7:
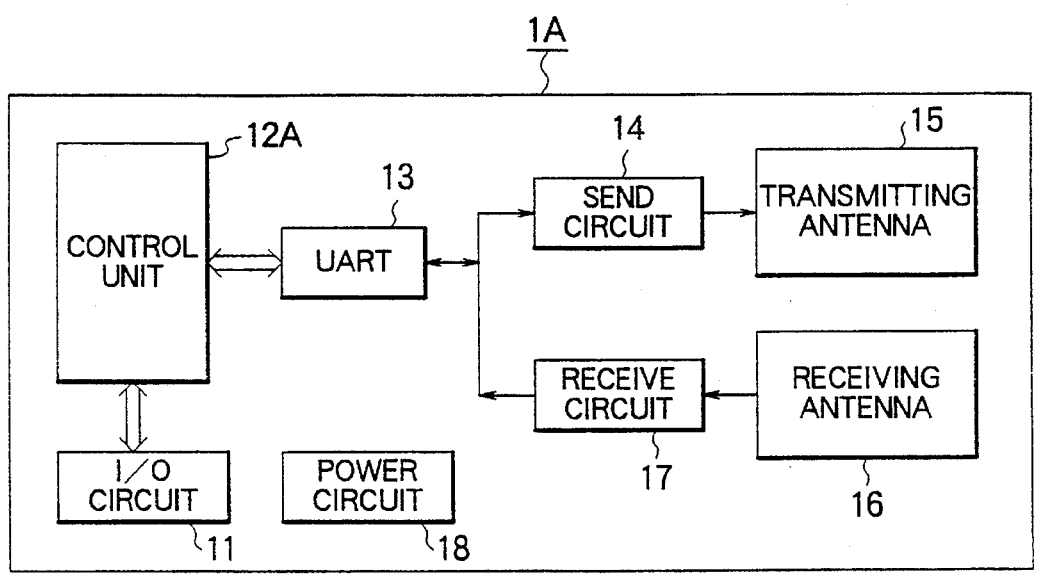
FIG. 7 is a block diagram showing the configuration of the card reader/writer according to still another embodiment of the present invention.

Still another embodiment of the present invention will be described with reference to the attached drawings. FIG. 7 shows the configuration of a card reader/writer 1A according to this embodiment of the present invention, an input/output circuit 11, and a UART 13 through a power circuit 18, i.e., including elements 14–17, being the same as those of the conventional card reader/writer 1.

Figure 8:
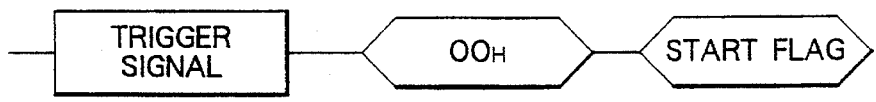
FIG. 8 shows a form of the signal transmitted by the card reader/writer of FIG. 7.

FIG. 8 shows the signal transmitted from the card reader/writer 1A to the noncontact IC card 2.

In FIG. 7, the card reader/writer 1A includes a control unit 12A, which differs from the conventional control unit 12 in function. The control unit 12A is equipped with a CPU, ROM, RAM, etc.

As shown in FIG. 8, the control unit 12A of the card reader/writer 1A inserts 1-byte dummy data "$00_H$" between the trigger signal and the start flag at the time of transmission. More specifically, the data are sent out so that the trigger signal is followed by data, an 8-bit data portion in a frame thereof being "$00_H$", which is further followed by a start flag, the 8-bit data portion in a frame thereof being "$5A_H$", for example, then regular data follows.

Figure 26:
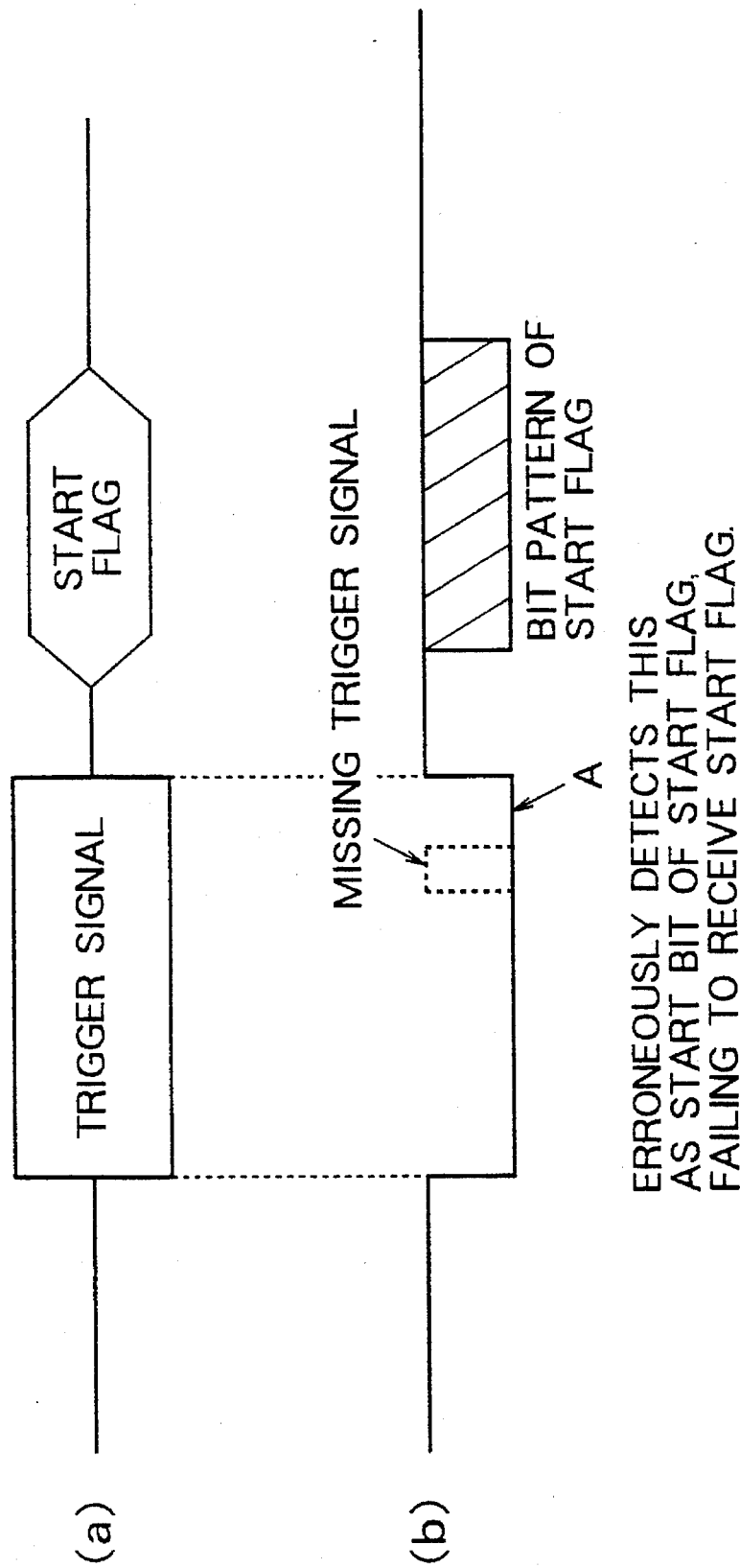
FIG. 26 shows a form of the signal transmitted from the card reader/writer to the noncontact IC card of FIG. 24.
Figure 27:
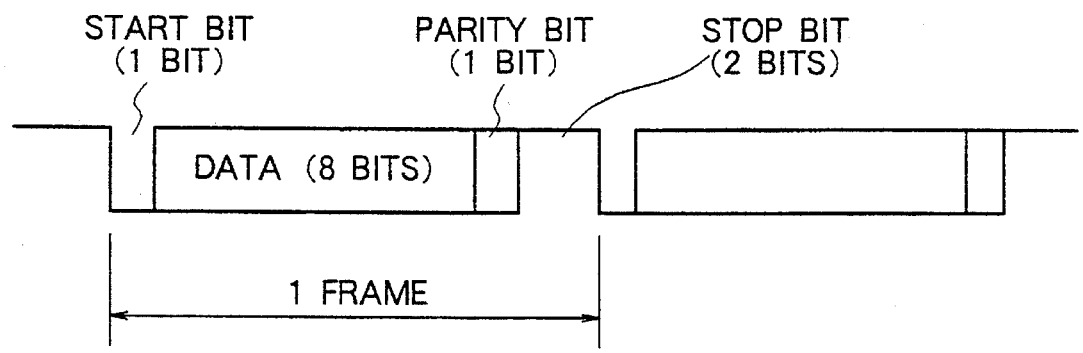
FIG. 27 shows a form of the signal transmitted from the card reader/writer to the noncontact IC card of FIG. 24.

As shown in (b) of FIG. 26, even if the noncontact IC card 2 erroneously detects portion A of the trigger signal as the start bit, a framing error occurs since the dummy data "$00_H$" follows, thus enabling it to correctly receive the next start flag. This leads to a reduced communication error rate and higher communication reliability.

Embodiment 4

Figure 9:
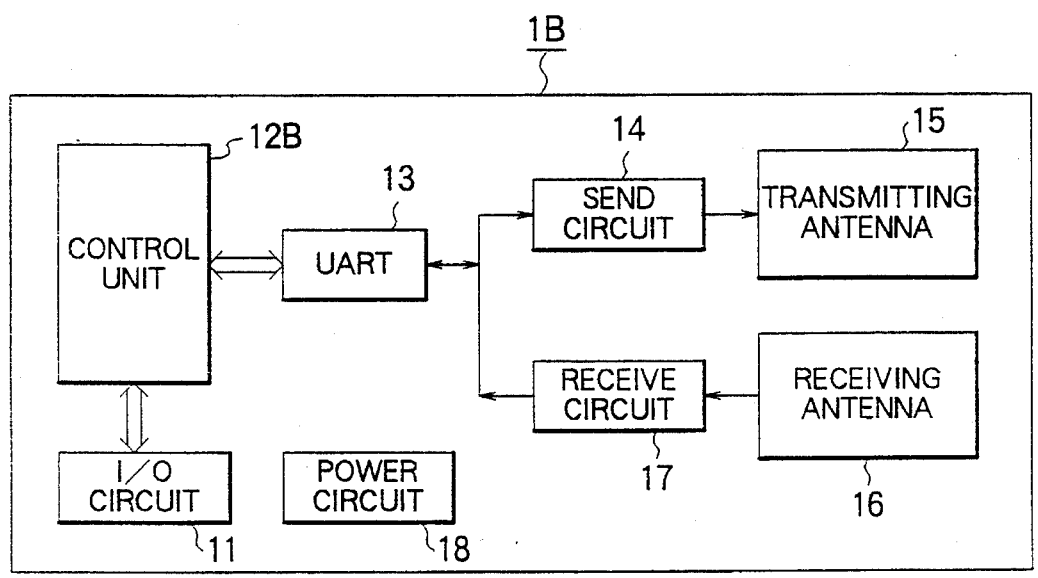
FIG. 9 is a block diagram showing the configuration of the card reader/writer according to a further embodiment of the present invention.

Yet another embodiment of the present invention will now be described with reference to the attached drawings. FIG. 9 shows the configuration of a card reader/writer 1B according to this embodiment of the present invention, the input/output circuit 11 and the UART 13 and elements 14 through the power circuit 18 being the same as those of the conventional card reader/writer 1.

Figure 10:
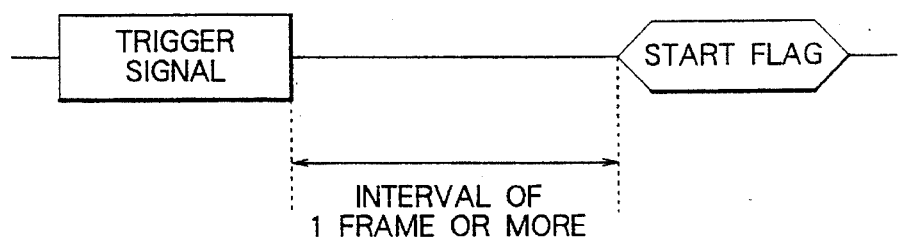
FIG. 10 shows a form of the signal transmitted by the card reader/writer of FIG. 9.

FIG. 10 shows the signal transmitted from the card reader/writer 1B to the noncontact IC card 2.

In FIG. 9, the card reader/writer 1B includes a control unit 12B which differs from the conventional control unit 12 in function. The control unit 12B has a CPU, ROM, RAM, etc.

As shown in FIG. 10, the control unit 12B of the card reader/writer 1B allows an interval of at least one frame (12 bits) between the trigger signal and the start flag at the time of transmission. More specifically, the control unit 12B transmits data so that the trigger signal is followed by a waiting time, which is equivalent to one frame set by, for example, a timer, then a start flag with the 8-bit data portion in a frame thereof being "$5A_H$" follows before regular data follows.

In the noncontact IC card 2, at the time of receiving, as shown in (b) of FIG. 26, if there is a missing trigger signal, the missing trigger signal causes the trigger signal to end even if receiving is enabled immediately after the trigger is received. The noncontact IC card then detects the next portion A as the start bit and receives 1-byte data, but it is very unlikely to match the start flag; therefore, the 1-byte data will be skipped, allowing the next start flag to be normally received. This reduces the communication error rate, thus achieving higher communication reliability.

Embodiment 5

Figure 11:
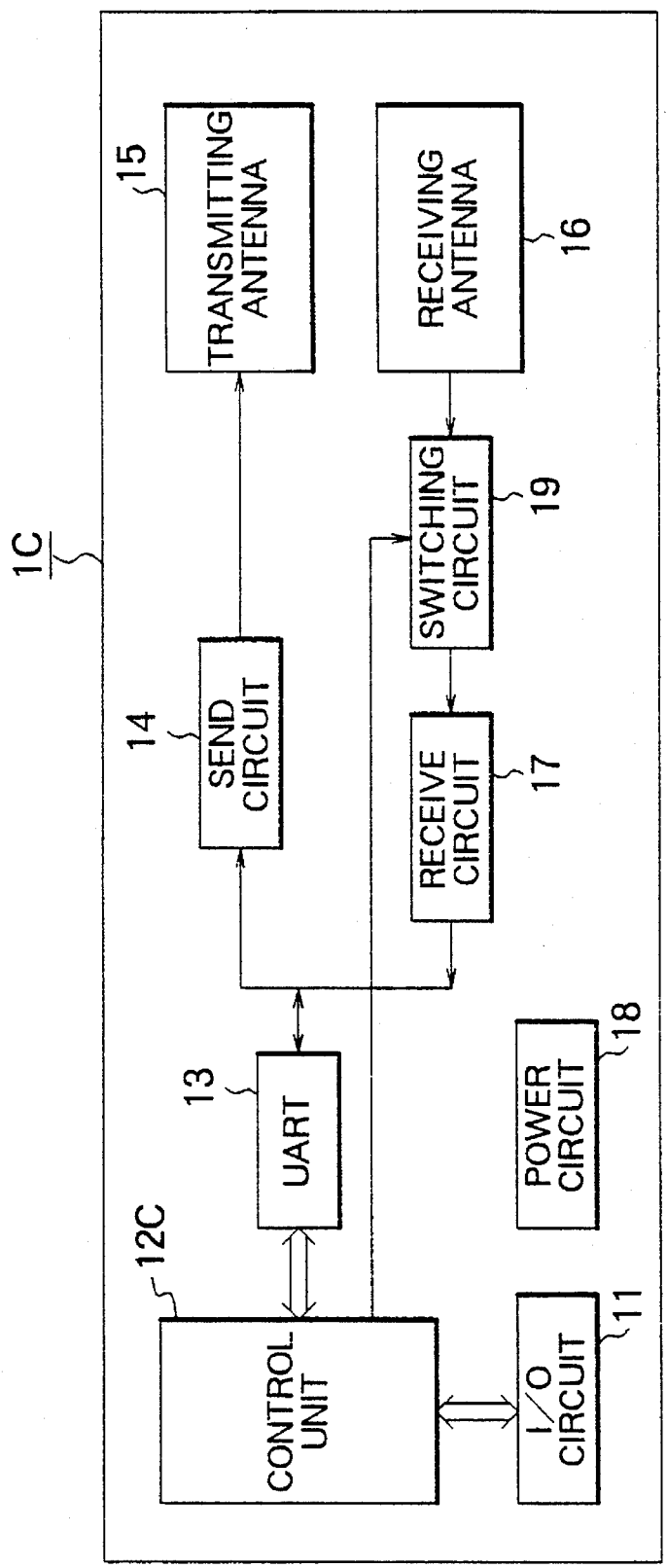
FIG. 11 is a block diagram showing the configuration of the card reader/writer according to yet another embodiment of the present invention.

Still another embodiment of the present invention will be described with reference to the attached drawings. FIG. 11 shows the configuration of a card reader/writer 1C according to this embodiment of the present invention, the input/output circuit 11 and the UART 13 and elements 14 through the power circuit 18 being the same as those of the conventional card reader/writer 1.

In FIG. 11, the card reader/writer 1C includes a control unit 12C which differs from the conventional control unit 12 in function, and a switching circuit 19 which includes an analog switch (e.g., M74HC4066) or a relay. The control unit 12C has a CPU, ROM, RAM, etc.

In the card reader/writer 1C, the receive circuit 17 is provided with the AGC 172, which adjusts the receiving sensitivity, thereby extending the receiving distance. The AGC 172, however, takes time to recover the original sensitivity thereof once the sensitivity decreases; therefore, if the card reader/writer 1C receives the intensive radio waves, which the card reader/writer 1C itself transmits, then the sensitivity cannot be recovered before the noncontact IC card 2 responds.

Accordingly, as shown in FIG. 11, the switching circuit 19 is connected between the receiving antenna 16 and the receive circuit 17. The control unit 12C turns the switching circuit 19 OFF during transmission by using a transmission status signal indicating that transmission is in process. This disconnects the receiving antenna 16 from the receive circuit 17 and the AGC 172 does not operate. Hence, the sensitivity of the AGC 172 does not decrease, making it possible to prevent the communication distance between the card reader/writer 1C and the noncontact IC card 2 from being decreased. The result is a lower communication error rate and higher communication reliability.

Embodiment 6

Figure 12:
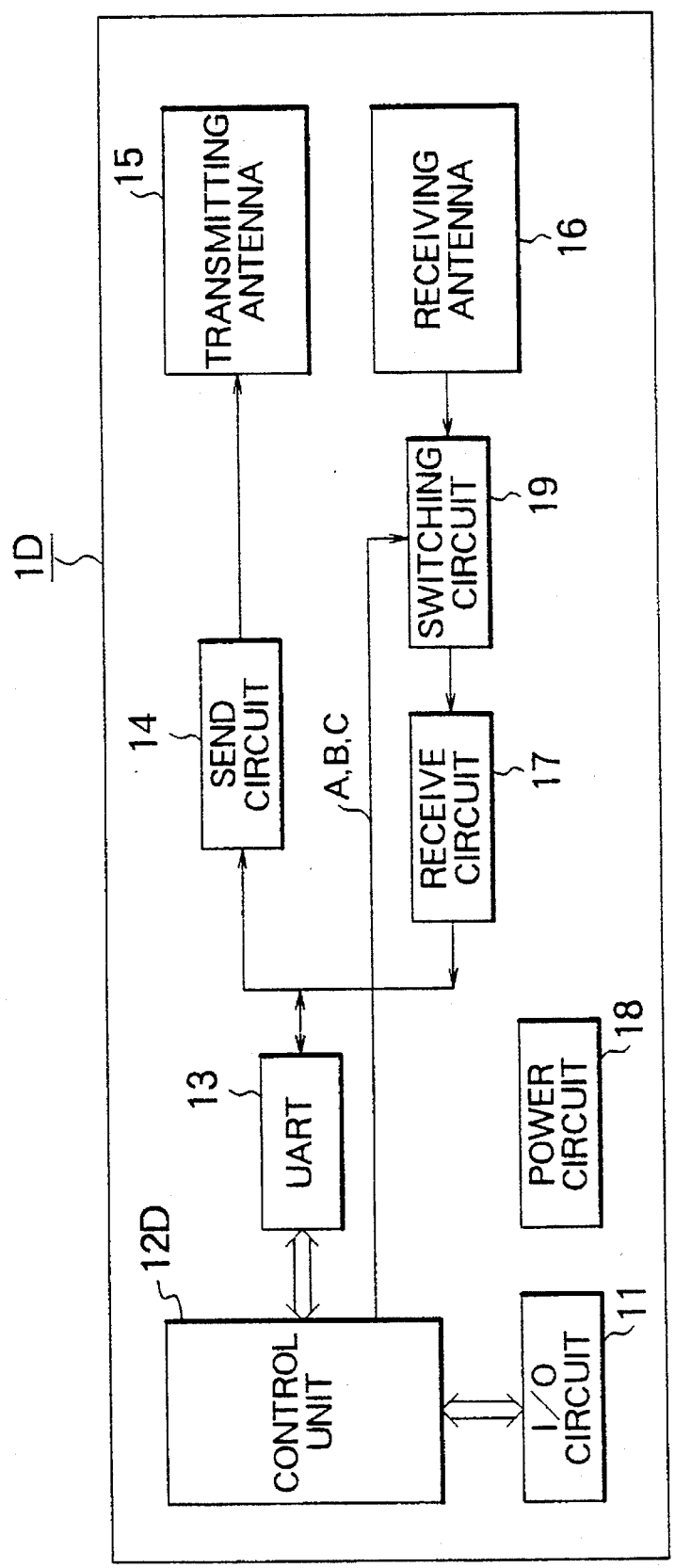
FIG. 12 is a block diagram showing the configuration of the card reader/writer according to a still further embodiment of the present invention.

Still another embodiment of the present invention will be described with reference to the attached drawings. FIG. 12 shows the configuration of a card reader/writer 1D according to this embodiment of the present invention, the input/output circuit 11 and the UART 13 and elements 14 through the power circuit 18 being the same as those of the conventional card reader/writer 1.

Figure 13:
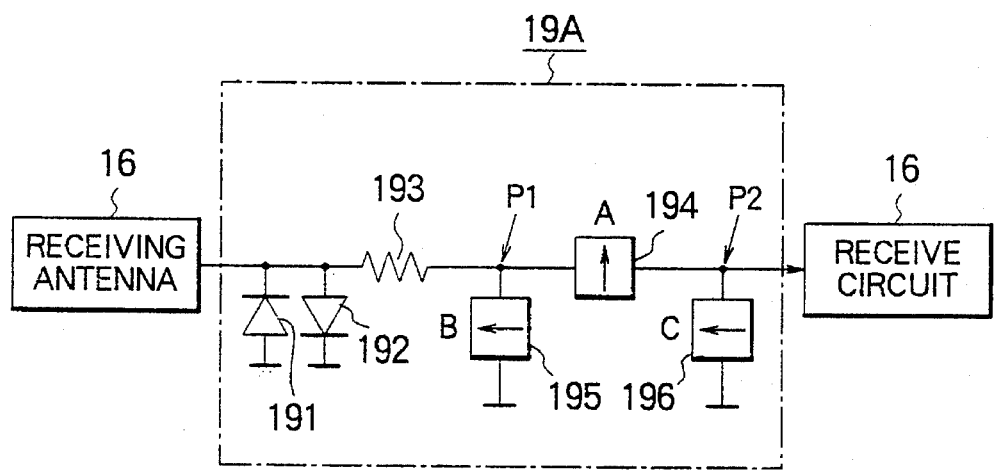
FIG. 13 shows the configuration of a switching circuit of FIG. 12.
Figure 14:
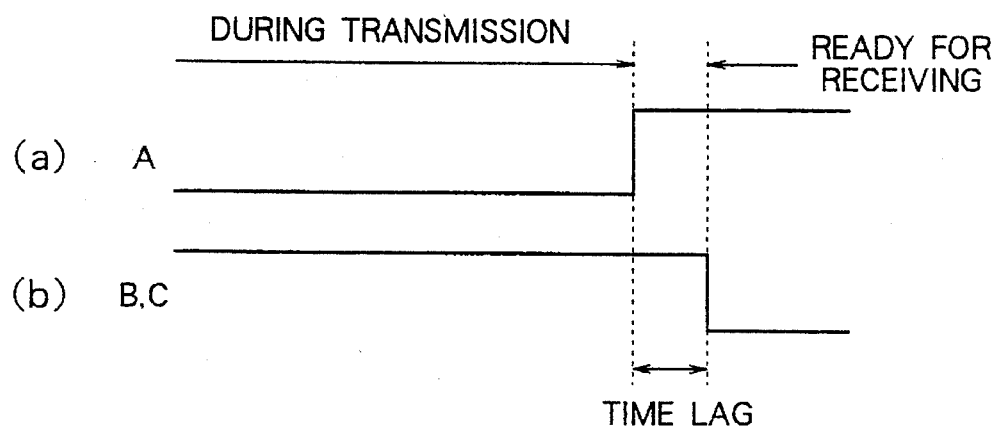
FIG. 14 is a timing chart showing the operation of the card reader/writer of FIG. 12.

FIG. 13 shows the configuration of a switching circuit 19A of the card reader/writer 1D. FIG. 14 illustrates the operation of a control unit 12D of the card reader/writer 1D.

In FIG. 12, the card reader/writer 1D includes a control unit 12D, which differs from the conventional control unit 12 in function, and a switching circuit 19A which includes analog switches, etc. The control unit 12D has a CPU, ROM, RAM, etc.

In FIG. 13, the switching circuit 19A includes Schottky diodes 191 and 192, a resistor 193 connected to the receiving antenna 16, an analog switch (e.g., M74HC4066) 194, which is connected to the resistor 193 and the receive circuit 17 and which turns ON/OFF in response to a control signal A of the control unit 12D, an analog switch (e.g., M74HC4066) 195, which is connected between a connection point P1 of the resistor 193 and the analog switch 194 and the earth and which turns ON/OFF in response to a control signal B of the control unit 12D, and an analog switch (e.g., M74HC4066) 196, which is connected between a connection point P2 of the analog switch 194 and the receive circuit 17 and the earth and which turns ON/OFF in response to a control signal C of the control unit 12D.

The analog switches 194 through 196 turn ON when the control signals A, B, and C are high, while they turn OFF when the control signals are low, however, they do not completely turn OFF; the analog switches provide resistance of $10^9$ Ω, for example, when they turn OFF, while they provide resistance of 45 Ω, for example, when they turn ON. Hence, the analog switch 194 alone is not enough to completely disconnect the receiving antenna 16 from the receive circuit 17. For this reason, the analog switches 195, 196, the resistor 193, and the Schottky diodes 191, 192 are also used in combination. The Schottky diodes 191, 192 clamp a signal received through the receiving antenna 16. When the amplitude of the signal exceeds the forward voltage ($V_F$) of the Schottky diodes 191, 192, the voltage exceeding the voltage level is cut, thereby controlling the amplitude of the received signal under the forward voltage $V_F$.

For transmission, the control unit 12D sets the control signal A to low to turn the analog switch 194 OFF and sets the control signals B and C to high to turn the analog switches 195 and 196 ON. For receiving, the control unit 12D sets the control signal A to high to turn the analog switch 194 ON, while it sets the control signals B and C to low to turn the analog switches 195 and 196 OFF.

The resistor 193, with the resistance (45 Ω) provided when the analog switch 195 is ON, works to decrease the voltage at the connection point P1 by dividing the voltage of an electrical signal received through the receiving antenna 16 when the analog switch 195 is ON. For instance, if the resistance of the resistor 193 is 200 Ω and the resistance provided when the analog switch 195 is ON is 45 Ω, then the voltage at the connection point P1 is 55 mV when the signal received through the receiving antenna 16 is 300 mV.

After that, the value of the voltage applied to the receive circuit 17 becomes nearly zero owing to the analog switches 194 (OFF resistance: $10^9$ Ω) and 196 (ON resistance: 45 Ω). As far as the resistance components are concerned, it seems that the two analog switches 194 and 196 alone are enough, however, in actual use, it is necessary to reduce the voltage at the connection point P1 because of the possible capacitive coupling of the input and output of the analog switch 194.

For receiving, the analog switch 194 is set to ON, while the analog switches 195 and 196 are set to OFF. The resistor 193 will be connected in series between the receiving antenna 16 and the receive circuit 17, but the receive voltage from the receiving antenna 16 will be transmitted as it is to the receive circuit 17 because there will be no voltage division.

As for the switching timing of the analog switch 194 and the analog switches 195 and 196, it has been found that providing a time lag causes such switching to exert less influence on the receive circuit 17 as shown in FIG. 14. Switching noise, which is caused by the analog switch 194 when it turns ON, is transmitted to the receive circuit 17. To prevent such switching noise from being transmitted to the receive circuit 17, the analog switches 195 and 196 are set to ON in advance.

The analog switches 194 through 196 work on digital circuits, generating digital noise when they operate. The receive signals of the receiving antenna 16 swing between positive and negative; therefore, positive/negative power supplies must normally be used for the analog switches 194 through 196. The switching circuit 19A, however, is designed so that the signal does not swing greatly to the negative side; therefore, the switching can be performed from a single power supply (e.g., a single 5-VDC power supply). In other words, the same effect as that in another embodiment (card reader/writer 1C) is achieved and the power circuit 18 works as a satisfactory power supply for the card reader/writer 1D, eliminating the need for any additional positive/negative power supply, contributing to reduced cost for configuring the system.

Embodiment 7

Figure 15:
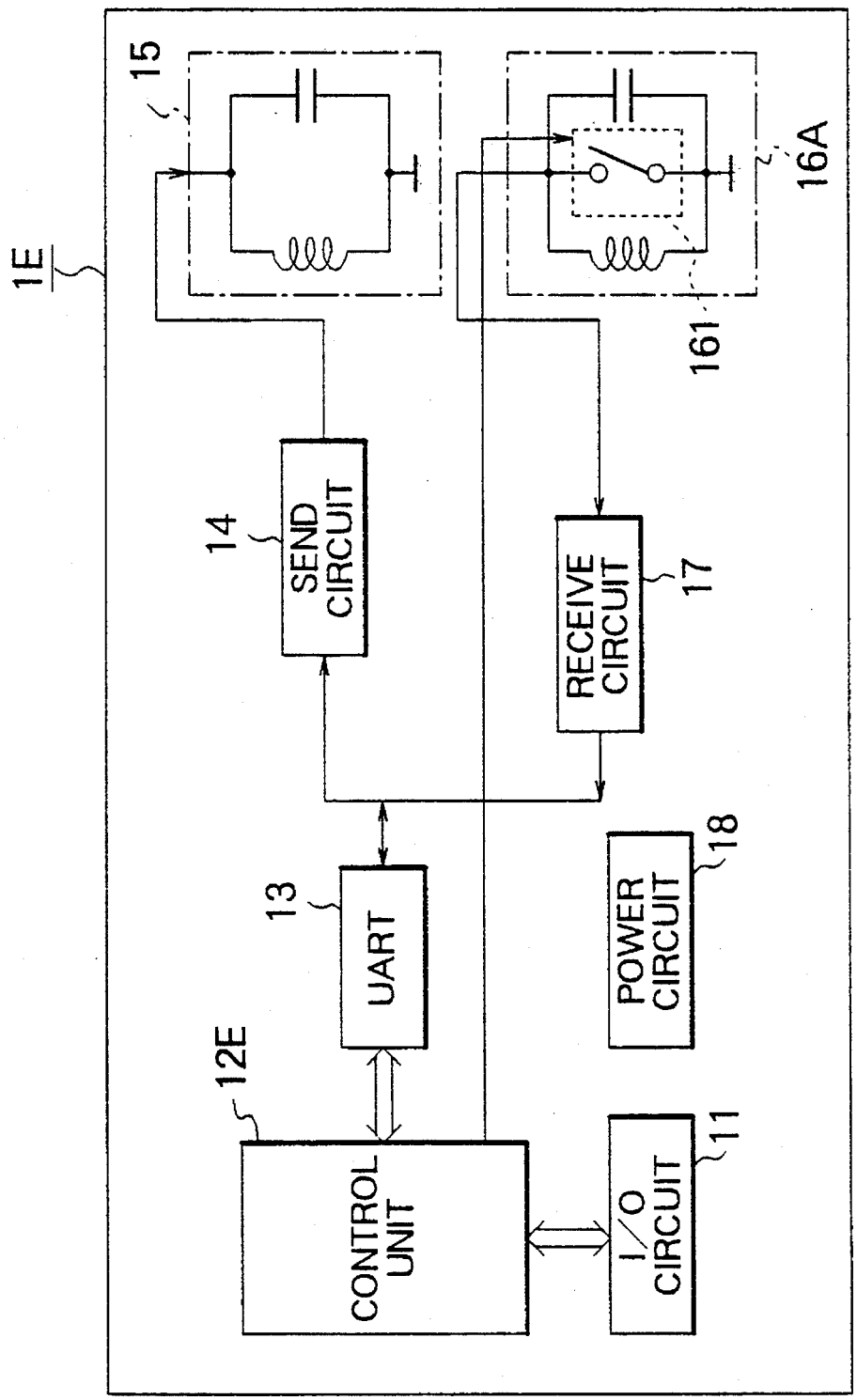
FIG. 15 is a block diagram showing the configuration of the card reader/writer according to an additional embodiment of the present invention.

A still further embodiment of the present invention will be described with reference to the attached drawings. FIG. 15 shows the configuration of a card reader/writer 1E according to this embodiment of the present invention, the input/output circuit 11, the UART 13 through the transmitting antenna 15, the receive circuit 17, and the power circuit 18 being the same as those of the conventional card reader/writer 1.

In FIG. 15, the card reader/writer 1E includes a control unit 12E which differs from the conventional control unit 12 in function, and a receiving antenna 16A, which has a switching circuit 161 having analog switches or relays. The control unit 12E is equipped with a CPU, ROM, RAM, etc.

During transmission, the switching circuit 161 is controlled by a transmission status signal from the control unit 12E to prevent the receiving antenna 16A from resonating.

The control unit 12E sets the switching circuit 161 to ON during transmission to prevent the receiving antenna 16A from resonating, while it sets the switching circuit 161 to OFF during receiving to receive radio waves. This prevents the transmitting antenna 15 and the receiving antenna 16A from interfering with each other, resulting in a reduced communication error rate, thus contributing to higher communication reliability.

Embodiment 8

Figure 16:
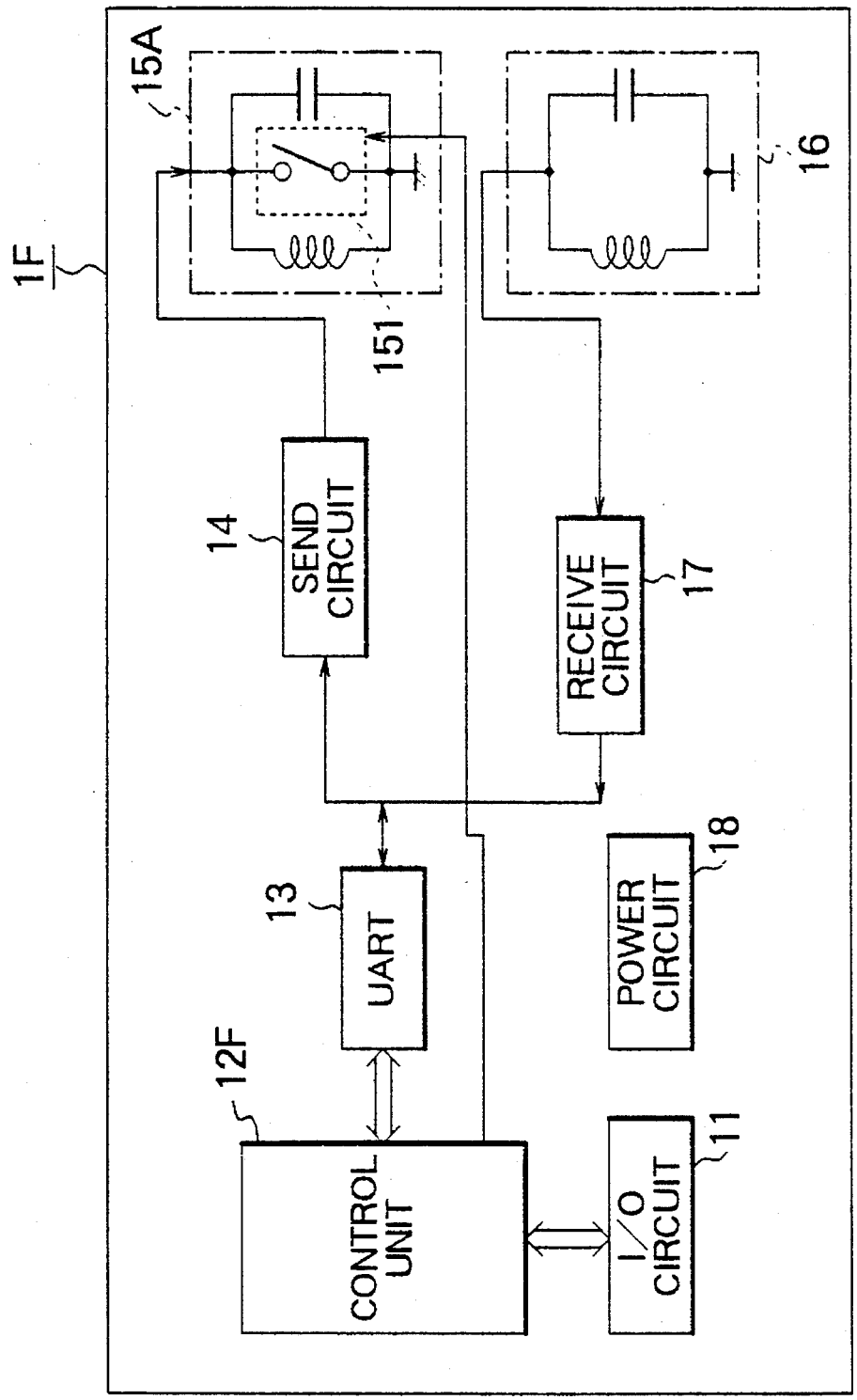
FIG. 16 is a block diagram showing the configuration of the card reader/writer according to a still further embodiment of the present invention.

Yet another embodiment of the present invention will be described with reference to the attached drawings. FIG. 16 shows the configuration of a card reader/writer 1F according to this embodiment of the present invention, the input/output circuit 11, the UART 13, the send circuit 14, and the receiving antenna 16 through the power circuit 18 being the same as those of the conventional card reader/writer 1.

Figure 17:
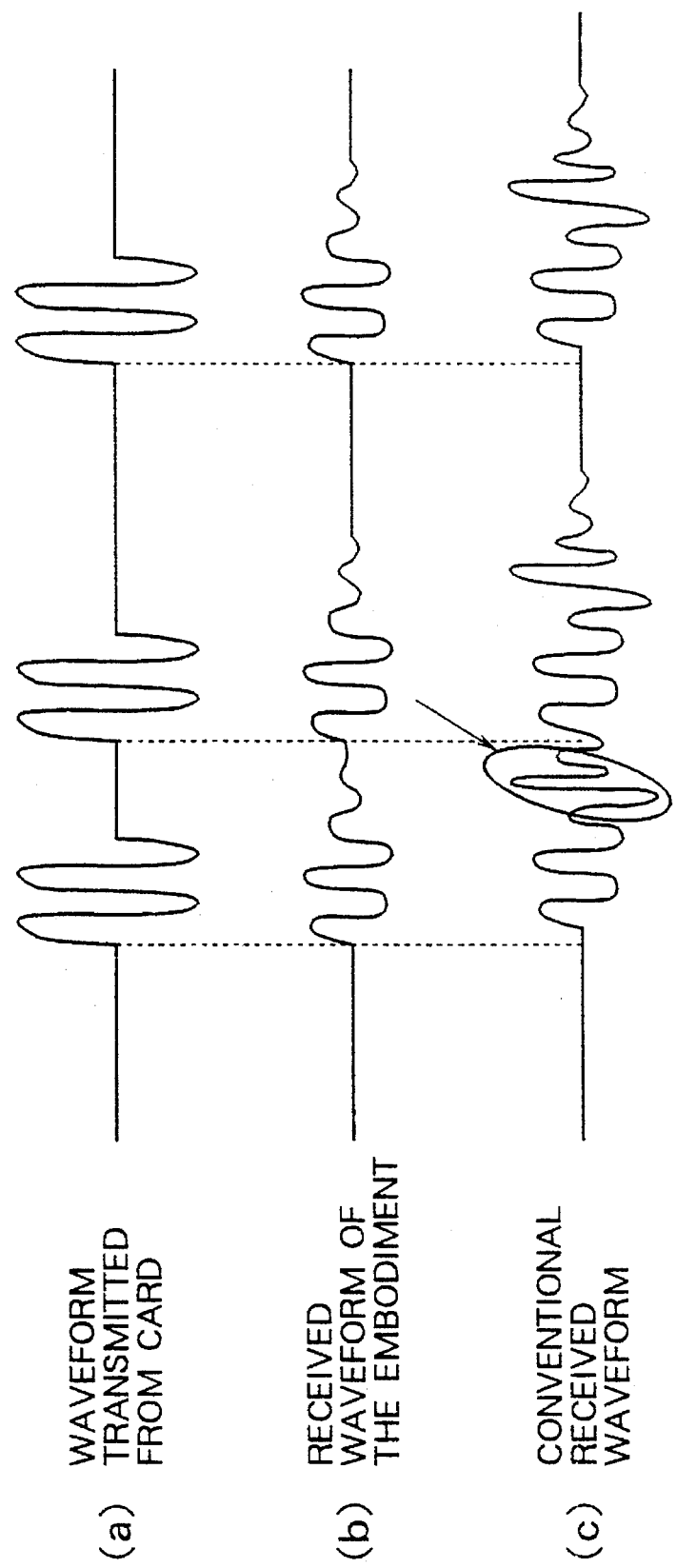
FIG. 17 shows the operation of the card reader/writer of FIG. 16.

FIG. 17 shows the waveforms of the receive signals of the card reader/writer 1F.

In FIG. 16, the card reader/writer 1F includes a control unit 12F, which differs from the conventional control unit 12 in function, and a transmitting antenna 15A, which has a switching circuit 151 having analog switches or relays. The control unit 12F is equipped with a CPU, ROM, RAM, etc.

In the card reader/writer 1E, both the transmitting antenna 15A and the receiving antenna 16 include parallel resonance circuits, and the transmitting antenna 15A also receives radio waves during receiving. For this reason, the two antennas resonate, and a slight difference in the resonance frequency disturbs the phase, causing the receiving antenna 16 to receive a waveform, which combines the waveform obtained through the transmitting antenna 15A and that received through the receiving antenna 16 as shown in (c) of FIG. 17. Hence, as shown by the arrowhead in (c) of the drawing, the received waveform is distorted, preventing the receiving antenna 16 from producing an intact received waveform.

Accordingly, the control unit 12F of the card reader/writer 1F sets the switching circuit 151 to ON in response to the receiving status signal during receiving in order to prevent resonance of the transmitting antenna 15A. This allows the receiving antenna 16 to receive a signal with an intact waveform as shown in (b) of FIG. 17. During transmission, the control unit 12F sets the switching circuit 151 to OFF. FIG. 17 (a) shows the waveform of the signal sent from the noncontact IC card 2 to the card reader/writer 1F. Hence, interference between the transmitting antenna 15A and the receiving antenna 16 can be prevented. This enables a reduced communication error rate, resulting in enhanced communication reliability.

Embodiment 9

Figure 18:
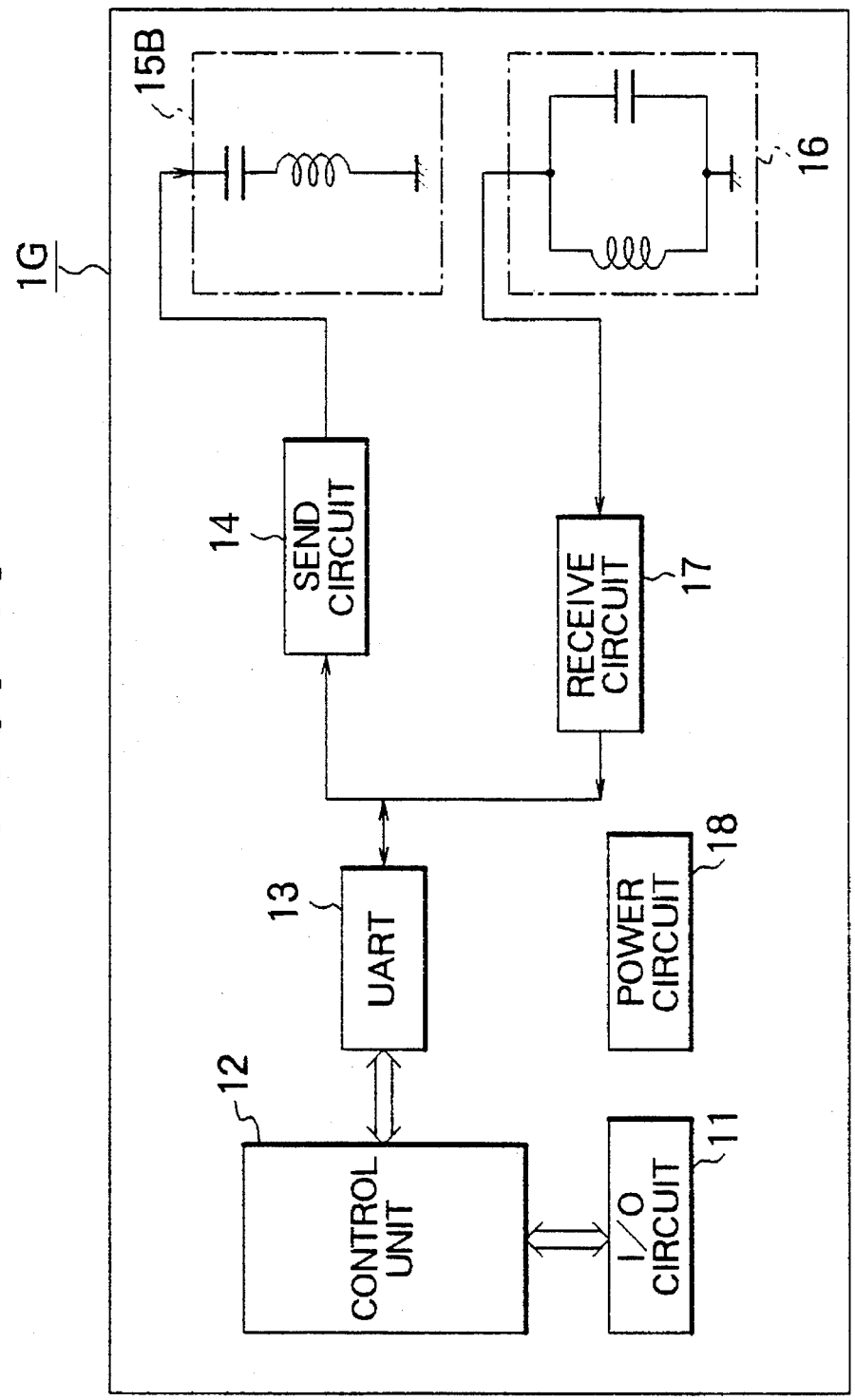
FIG. 18 is a block diagram showing the configuration of the card reader/writer according to another embodiment of the present invention.

Another embodiment of the present invention will be described with reference to the attached drawings. FIG. 18 shows the configuration of a card reader/writer 1G according to this embodiment of the present invention, the input/output circuit 11 through the send circuit 14, and the receiving antenna 16 through the power circuit 18 being the same as those of the conventional card reader/writer 1.

In FIG. 18, the card reader/writer 1G is equipped with a transmitting antenna 15B, which has a series resonance circuit.

Configuring the transmitting antenna 15B with the series resonance circuit does not form the loop as in the parallel resonance circuit, thus preventing radio waves from being received. This makes it possible to protect the waveform of the signal received through the receiving antenna 16 from being distorted, leading to a reduced communication error rate with resultant higher communication reliability.

The series resonance circuit requires larger electrical driving currents than the parallel resonance circuit; therefore, it is necessary to increase the capacity of the power circuit 18 of the card reader/writer 1G when using the series resonance circuit. The series resonance circuit, however, can be driven at a lower voltage and therefore, it is not necessary to use two power supplies as in a case where the parallel resonance circuit is used; a single power supply of, for example, 5 VDC may be used for the card reader/writer 1G (the voltage depends on Q in the case of the series resonance).

Embodiment 10

Figure 19:
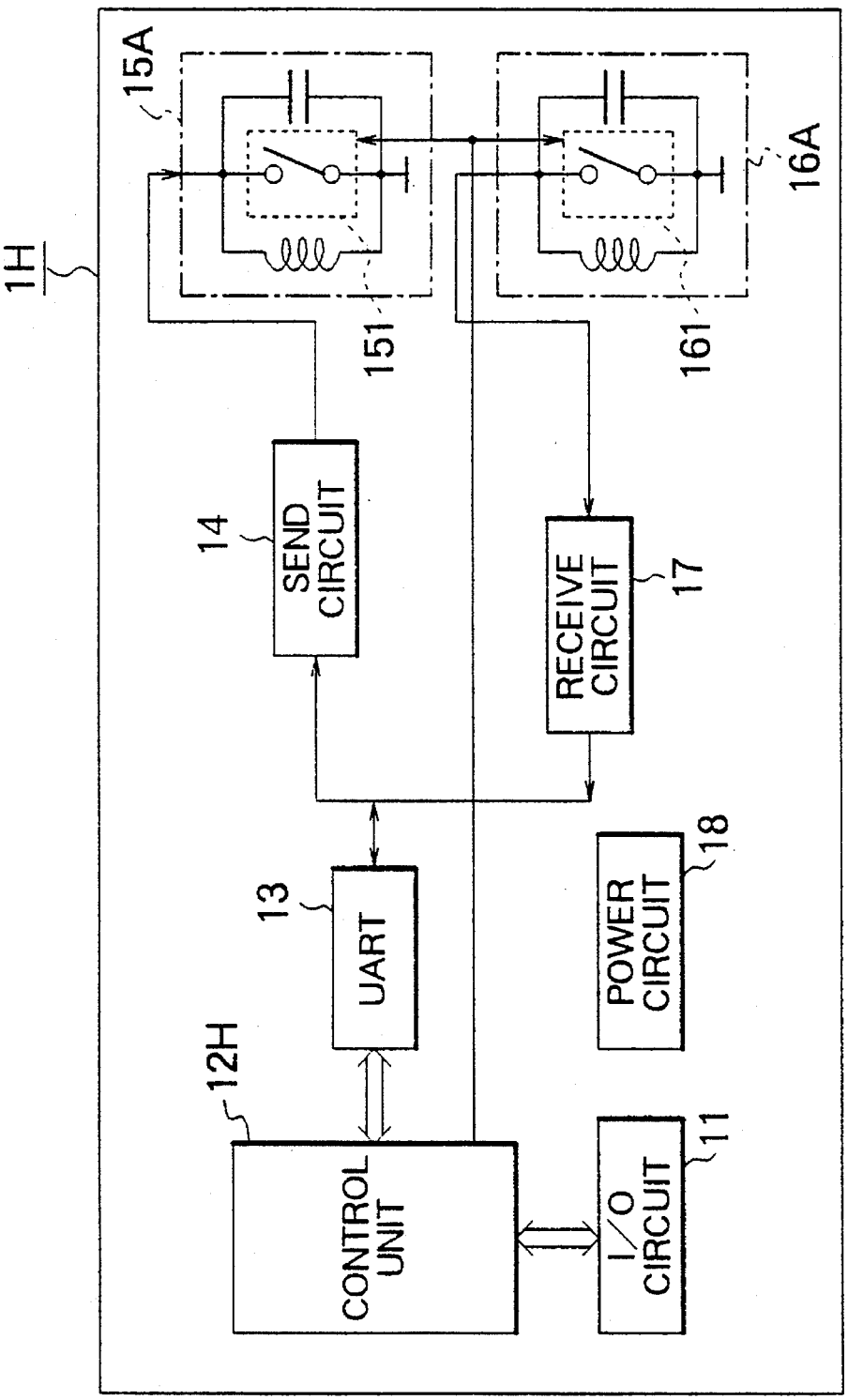
FIG. 19 is a block diagram showing the configuration of the card reader/writer according to a further embodiment of the present invention.

Yet another embodiment of the present invention will be described with reference to the attached drawings. FIG. 19 shows the configuration of a card reader/writer 1H according to this embodiment of the present invention, the input/output circuit 11, the UART 13, the send circuit 14, the receive circuit 17, and the power circuit 18 being the same as those of the conventional card reader/writer 1.

In FIG. 19, the card reader/writer 1H includes a control unit 12H, which differs from the conventional control unit 12 in function, the transmitting antenna 15A, which has the foregoing switching circuit 151, and the receiving antenna 16A which has the foregoing switching circuit 161. The control unit 12H is equipped with a CPU, ROM, RAM, etc.

The card reader/writer 1H is equipped with the transmitting antenna 15A and the receiving antenna 16A, which have already been explained. Hence, it permits extension of the receiving distance and prevents the transmitting antenna 15A from affecting the receiving antenna 16A, making it possible to reduce the communication error rate with resultant higher communication reliability.

Embodiment 11

Figure 20:
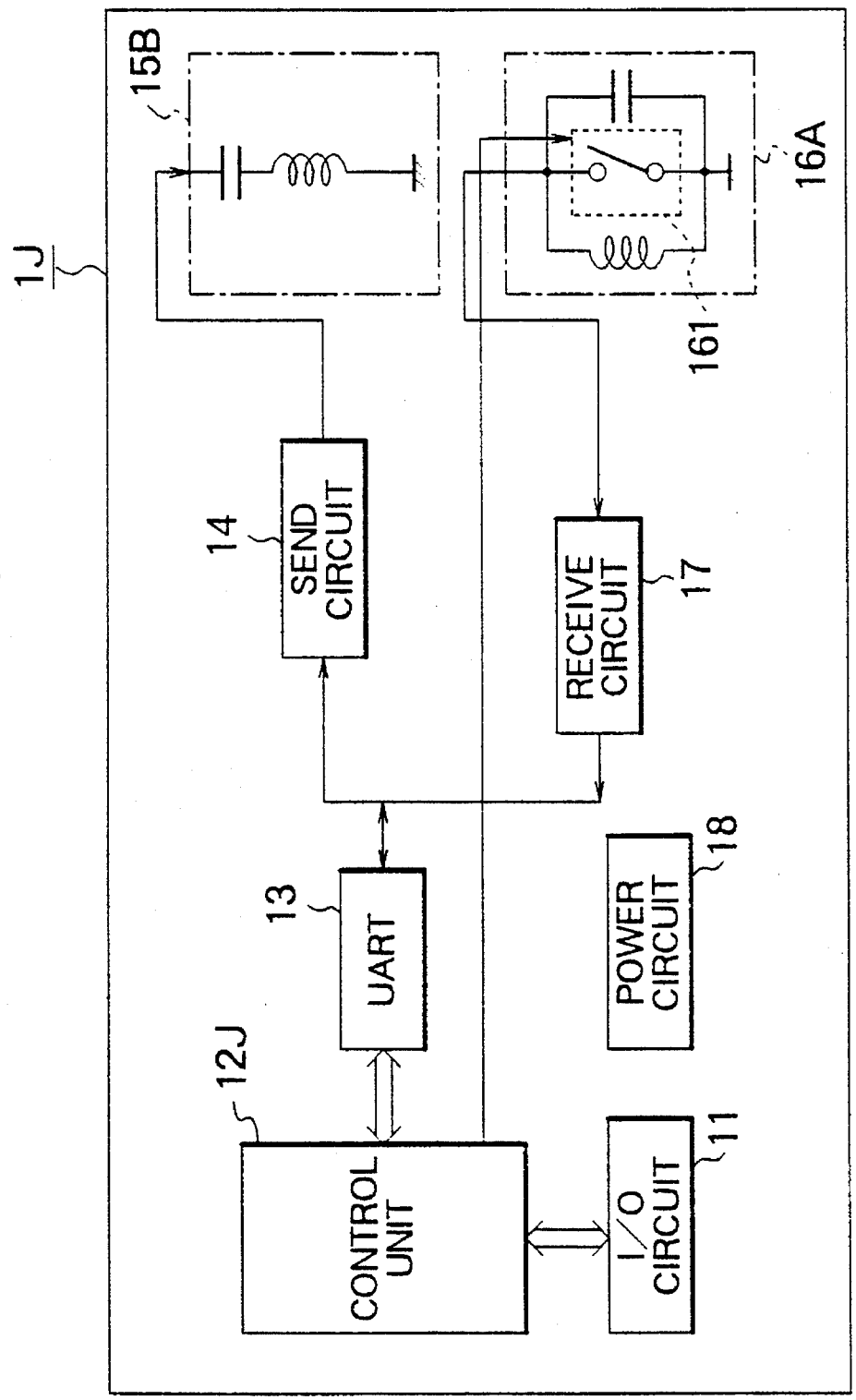
FIG. 20 is a block diagram showing the configuration of the card reader/writer according to yet another embodiment of the present invention.

A still further embodiment of the present invention will be described with reference to the attached drawings. FIG. 20 shows the configuration of a card reader/writer 1J according to this embodiment of the present invention, the input/output circuit 11, the UART 13, the send circuit 14, the receive circuit 17, and the power circuit 18 being the same as those of the conventional card reader/writer 1.

In FIG. 20, the card reader/writer 1J includes a control unit 12J, which differs from the conventional control unit 12 in function, and the transmitting antenna 15B, which includes a series resonance circuit, and the receiving antenna 16A, which has the foregoing switching circuit 161. The control unit 12J provided with a CPU, ROM, RAM, etc.

The card reader/writer 1J is equipped with the transmitting antenna 15B and the receiving antenna 16A, which have already been explained. Hence, it permits extension of the receiving distance and prevents the transmitting antenna 15B from affecting the receiving antenna 16A, making it possible to reduce the communication error rate with resultant higher communication reliability.

Embodiment 12

Figure 21:
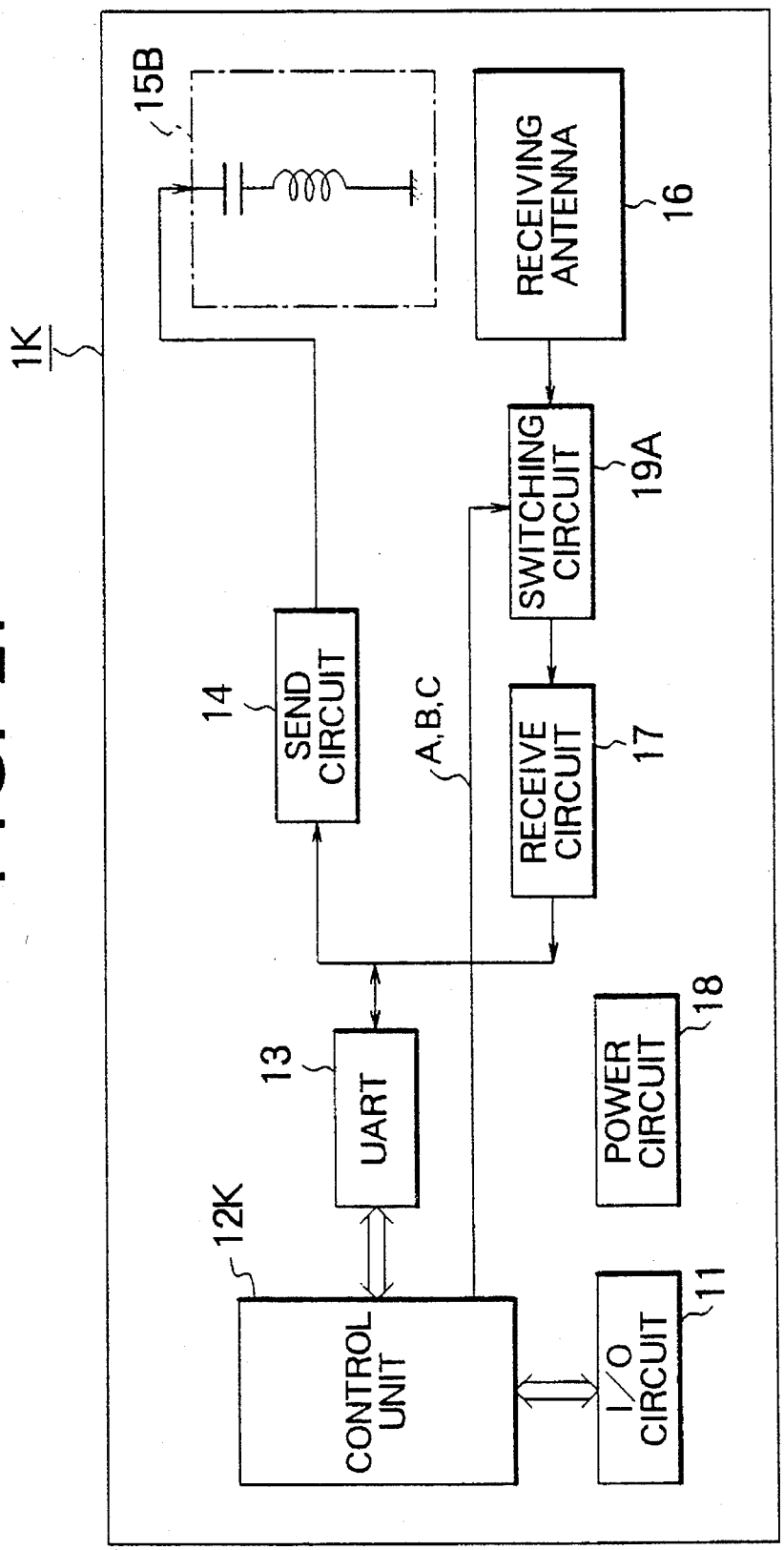
FIG. 21 is a block diagram showing the configuration of the card reader/writer according to another embodiment of the present invention.

An additional embodiment of the present invention will be described with reference to the attached drawings. FIG. 21 shows the configuration of a card reader/writer 1K according to this embodiment of the present invention, the input/output circuit 11, the UART 13, the send circuit 14, the receiving antenna 16, the receive circuit 17, and the power circuit 18 being the same as those of the conventional card reader/writer 1.

In FIG. 21, the card reader/writer 1K includes a control unit 12K, which differs from the conventional control unit 12 in function but has the same function as that of the control unit 12A of FIG. 7 and the control unit 12D of FIG. 12, the transmitting antenna 15B, which has a series resonance circuit, and the foregoing switching circuit 19A. The control unit 12K is equipped with a CPU, ROM, RAM, etc.

The card reader/writer 1K is equipped with the control units 12A and 12D, the transmitting antenna 15B, and the switching circuit 19A, which have already been explained. Hence, it is possible to achieve a card reader/writer, which is capable of changing the form of a send signal, protecting the receive circuit from being affected during transmission, and preventing the transmitting antenna from interfering with the receiving antenna. In addition, the noncontact IC card is capable of receiving the start flag more surely. Thus, a card reader/writer and a noncontact IC card, which ensure a lower communication error rate and higher communication reliability, can be achieved.

Figure 22:
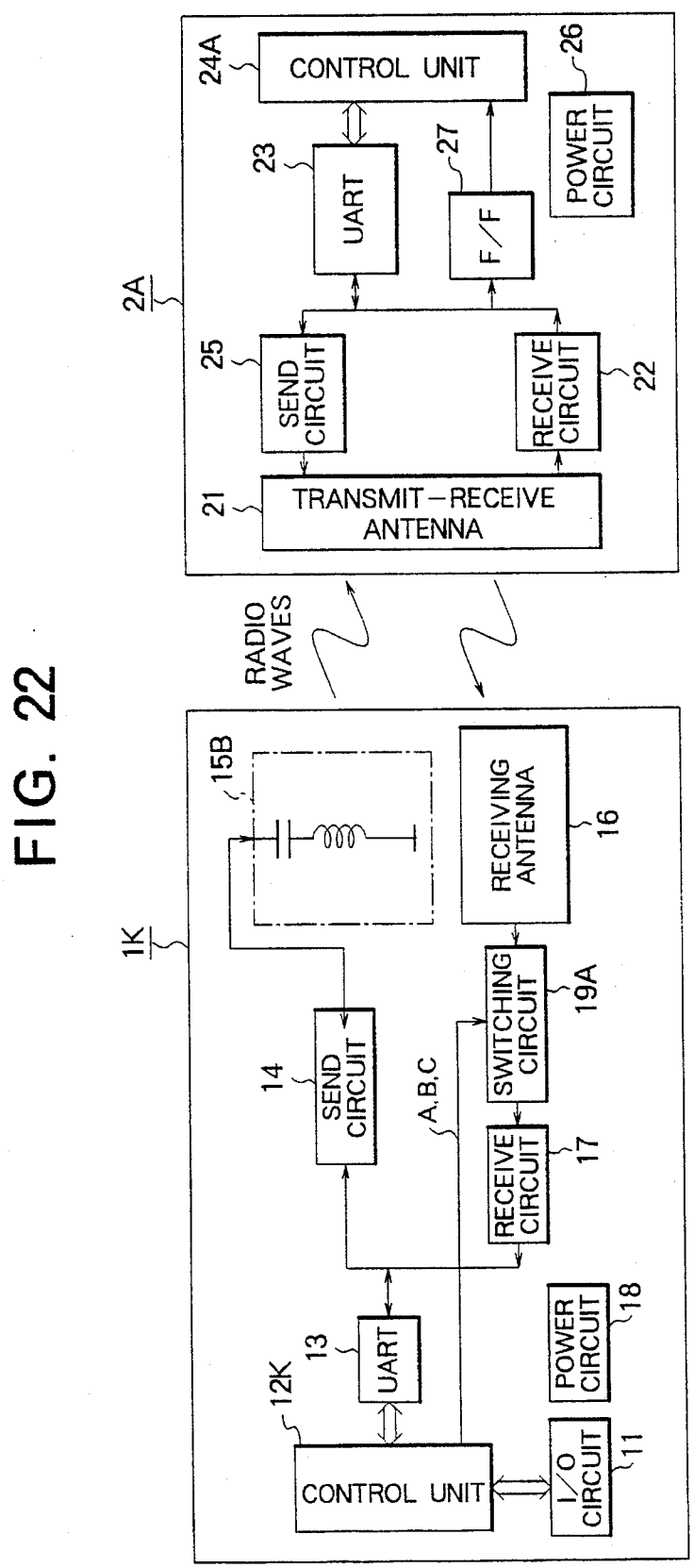
FIG. 22 shows a card system according to a further embodiment of the present invention.
Figure 23:
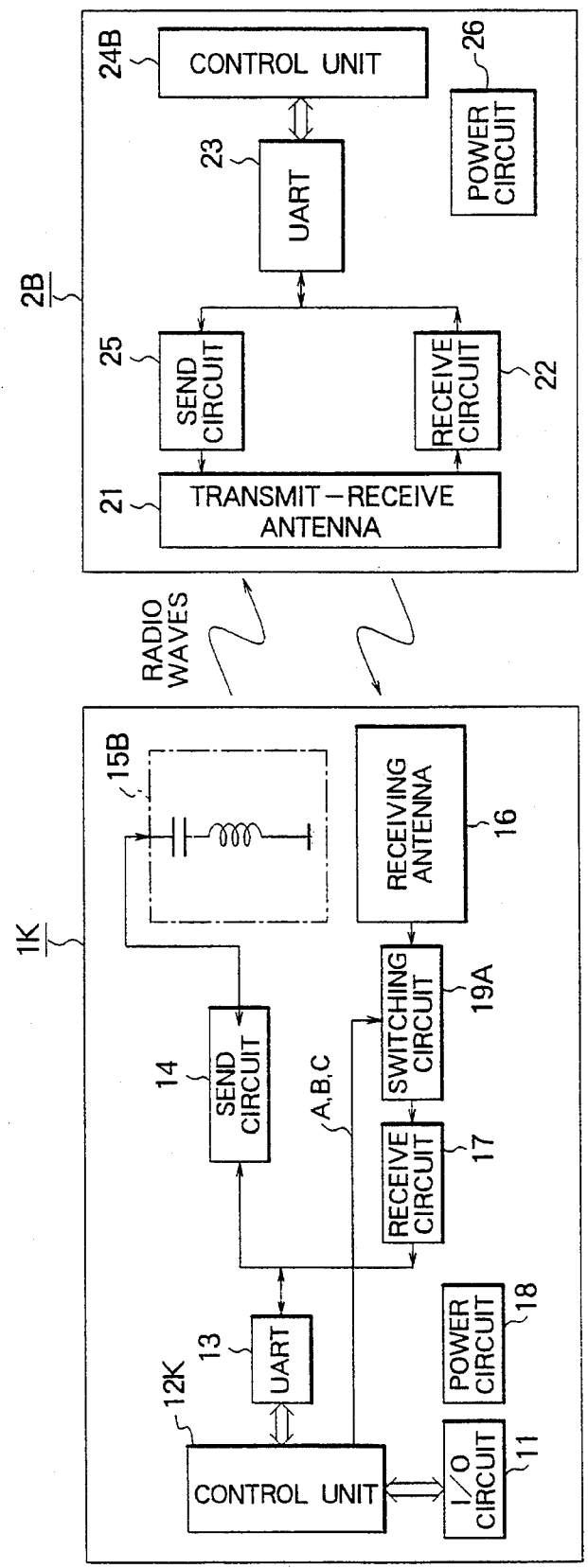
FIG. 23 shows a card system according to yet another embodiment of the present invention.
Figure 24:
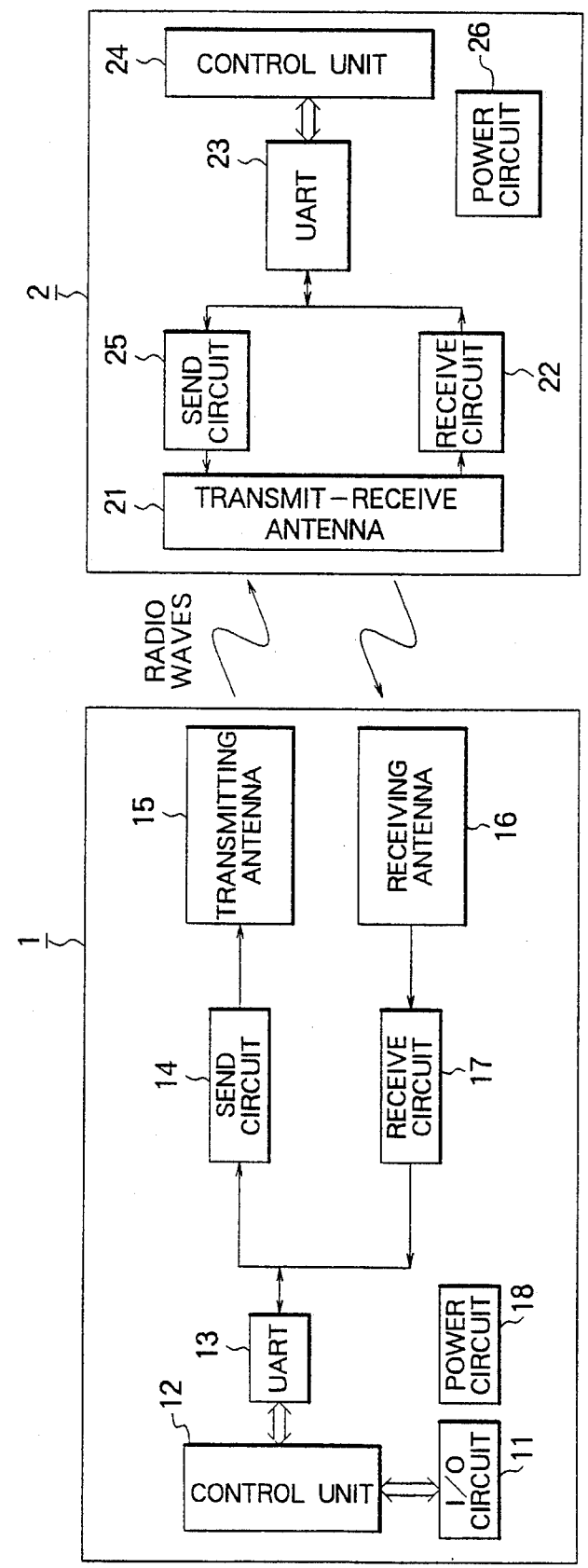
FIG. 24 is a block diagram showing a card apparatus which includes a conventional card reader/writer and noncontact IC card.
Figure 25:
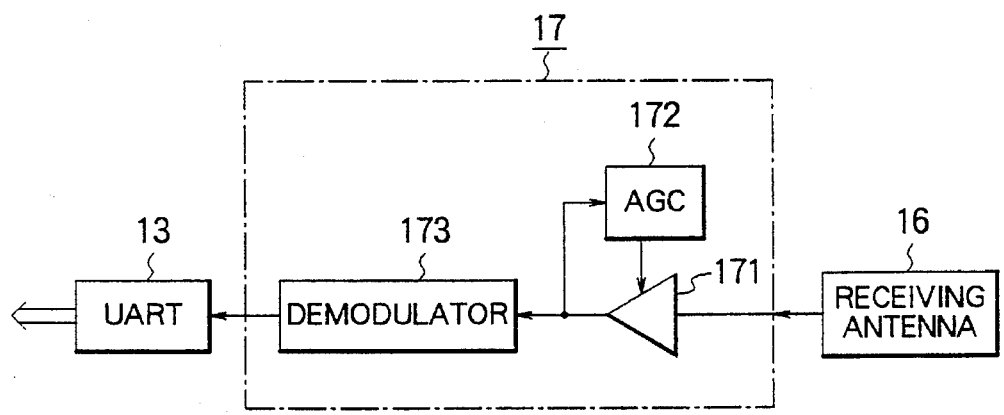
FIG. 25 shows the configuration of a receive circuit of the card reader/writer of FIG. 24.

Further, a card system capable of reducing the communication error rate and improving the communication reliability can be accomplished by combining the foregoing card reader/writer 1K and the aforesaid noncontact IC card 2A as shown in FIG. 22, or by combining the foregoing card reader/writer 1K and the aforesaid noncontact IC card 2B as shown in FIG. 23.

What is claimed is:

1. A card reader/writer comprising:

a UART for converting a digital signal in serial form into parallel form and vice versa;

a send circuit for modulating a digital signal in serial form from said UART and converting it into a send electrical signal;

a transmitting antenna for transmitting the send electrical signal as a radio wave;

a receiving antenna for converting a received radio wave into a received electrical signal;

a receive circuit for demodulating a received electrical signal and converting it into a digital signal; and a control unit for controlling said card reader/writer and for setting an interval between a trigger signal and a start flag to at least one frame.

2. The card reader/writer according to claim 1, wherein the control unit inserts dummy data between said trigger signal and the start flag.

3. The card reader/writer according to claim 2, wherein said transmitting antenna is a series resonance circuit.

4. The card reader/writer according to claim 3, further comprising a switching circuit connected between said receiving antenna and said receive circuit for disconnecting them during transmission.

5. The card reader/writer according to claim 4, wherein said switching circuit disconnects said receiving antenna and said receive circuit with a timing, that prevents switching noise from being transmitted to said receive circuit.

* * * * *

UNITED STATES PATENT AND TRADEMARK OFFICE
CERTIFICATE OF CORRECTION

PATENT NO. : 5,604,342
DATED : February 18, 1997
INVENTOR(S) : Fujioka

It is certified that error appears in the above-indentified patent and that said Letters Patent is hereby corrected as shown below: On the title page:

Item 73: Assignee, change "Mitsubishi Semiconductor Software Co. Ltd." to --Mitsubishi Electric Semiconductor Software Co., Ltd.--.

Signed and Sealed this

Twenty-ninth Day of July, 1997

Attest:

BRUCE LEHMAN

Attesting Officer

Commissioner of Patents and Trademarks